US006052267A

United States Patent [19]

Kasai et al.

[11] Patent Number: 6,052,267

[45] Date of Patent: Apr. 18, 2000

[54] ELECTRIC FIELD DISCHARGE SURGE ABSORBING ELEMENT AND METHOD FOR MAKING SAME

[75] Inventors: Yoshito Kasai; Masayoshi Misawa; So Yonekubo, all of Nagano, Japan

[73] Assignees: Okaya Electric Industries Co., Ltd.; Nagano Ken (Nagano Prefecture), both of Japan

[21] Appl. No.: 08/939,217

[22] Filed: Sep. 29, 1997

[51] Int. Cl.[7] .......... H02H 9/00

[52] U.S. Cl. .......... 361/56; 361/111; 361/120; 361/129

[58] Field of Search .......... 361/56, 58, 111, 361/117, 118, 119, 127, 129, 88, 120; 438/323, 692, 753; 313/300, 309, 317, 326

[56] References Cited

U.S. PATENT DOCUMENTS 3,671,798 6/1972 Lees .......... 313/336

*Primary Examiner*—Stephen W Jackson
*Attorney, Agent, or Firm*—Morrison Law Firm

[57] ABSTRACT

An electric field electron discharge surge absorbing element includes a first substrate member having an electron discharge portion on which a plurality of emitters are formed, and a second substrate member having a surface on which no emitters are formed. The surface and the electron emitter portion face each other, separated at a prescribed distance by a frame member. A vacuum is formed in the envelope between the substrate members and the frame member. External electrode layers are formed on the outer surfaces of each substrate member. The emitter cones may be etched from a semiconductor material, or may be diamond crystals deposited in place.

21 Claims, 32 Drawing Sheets

ELECTRIC FIELD DISCHARGE SURGE ABSORBING ELEMENT AND METHOD FOR MAKING SAME

BACKGROUND OF THE INVENTION

The present invention relates to a surge absorbing element connected between wires or between a wire and ground in order to protect the electronic circuit of an electronic device from surges such as overvoltages that enter via power supply lines, via communication lines, or the like.

Referring to FIG. 42, there is shown a configuration for a conventional surge absorbing element. A surge absorbing element 72 is connected between lines L1, L2 or between lines L1, L2 and ground. Lines L1, L2 are power-supply lines, communication lines, or the like connected to an electronic circuit 70 of an electronic device. Surge absorbing element 72 protects electronic circuit 70 from lightning surges and the like.

When a surge voltage that exceeds the rating of surge absorbing element 72 is applied between lines L1, L2 or between lines L1, L2 and ground, the surge voltage is conducted through surge absorbing element 72, thus protecting electronic circuit 70.

Surge absorbing element 72 can comprise a gas arrester that uses discharging in a discharge gap, a varistor that has non-linear voltage properties, or the like. Responsiveness is the most important property for reliably protecting electronic circuit 70 from surges.

Currently, one of the most responsive surge absorbers is the silicon surge absorber, which takes advantage of the avalanche effect in pn-junction semiconductors.

However, in practical terms, many silicon surge absorbers have relatively large electrostatic capacities on the order of 2000–5000 pF. This problem is unique to elements that use pn-junction structures. Silicon surge absorbers have electrostatic capacities that correspond to the size of the depletion layer.

For this reason, when such an element is connected to a communication circuit through which high-frequency signals are sent, the impedance is lowered and current leakage is increased. This results in the signal being bypassed via the silicon surge absorber.

Another disadvantage of silicon surge absorbers is that their operating voltage (voltage rating) must be set within a relatively narrow range of around ten volts to several hundred volts per unit.

For this reason, obtaining a relatively high operating voltage requires a plurality of elements connected in series, thus making the overall configuration larger and more complex.

OBJECTS AND SUMMARY OF THE INVENTION

The object of the present invention is to provide a surge absorbing element that has a smaller electrostatic capacity.

Another object of the present invention is to provide a surge absorbing element that can have a relatively high operating voltage per unit.

Another object of the present invention is to provide a surge absorbing element that has a responsiveness that is neither better nor worse than that of silicon surge absorbers.

Briefly stated, an electric field electron discharge surge absorbing element includes a first substrate member having an electron discharge portion on which a plurality of emitter cones are formed, and a second substrate member having a flat portion on which no emitter cones are formed. The flat portion and the electron emitter portion face each other, and are separated at a prescribed distance by a frame member. A vacuum is formed in the envelope between the substrate members and the frame member. External electrode layers are formed on the outer surfaces of each substrate member. The emitter cones may be made of a semiconductor material, or may be made of diamond crystals.

According to an embodiment of the present invention, an electric field electron discharge surge absorbing element comprises a first substrate member made from a semiconductor material having on a surface an electron discharge portion, on which a plurality of emitters are formed, a second substrate member having a surface, the electron discharge portion and the surface being positioned to face each other, a frame member, effective to separate the electron discharge portion and the surface by a prescribed distance, said distance between said electron discharge portion and said surface being substantially equal, an air-tight seal between inner surface perimeter portions of the first and second substrate members and the frame member, and outer electrode layers formed on outer surfaces of the first substrate member and second substrate member.

According to another embodiment of the present invention, an electric field electron discharge surge absorbing element comprises a first substrate member, said first substrate member being made from a semiconductor material and having first and second surface portions, having on the first surface portion an electron discharge portion, on which a plurality of emitters are formed, and a portion on said second surface portion not occupied by emitters, a second substrate member, said second substrate member being made from a semiconductor material and having first and second surface portions, having on the first surface portion an electron discharge portion, on which a plurality of emitters are formed, and a portion on said second surface portion not occupied by emitters, the first and second substrate members being positioned to face each other such that ends of the emitters on each of the substrate members face the second surface portion of another of the substrate members, a frame member, effective to separate the first and second substrate members by a prescribed distance, said distance between said electron discharge portion and said second surface portion being substantially equal throughout, an air-tight seal between inner surface perimeter portions of the first and second substrate members and the frame member, and external electrode layers formed on outer surfaces of the first substrate member and the second substrate member.

According to another embodiment of the present invention, a method for making an electric field electron discharge surge absorbing element comprises the steps of forming a plurality of oxidized-film masks on a surface of a first substrate member, performing reactive ion etching on the surface of the first substrate member to form pillar-shaped projections under the oxidized-film masks, performing anisotropic wet etching on the projections to etch the surface and form emitters, positioning the first substrate member having the emitters to face a second substrate member, the second substrate member having a surface, separating the first and second substrate members at a prescribed distance by a frame member, the distance between said emitters and said surface being substantially equal throughout, sealing inner surface perimeter portions of the first and second substrate members and the frame member to form an envelope, and drawing a vacuum within the envelope.

According to another embodiment of the present invention, a method for making an electric field electron discharge surge absorbing element comprises the steps of placing a first substrate member, the first substrate member being a semiconductor, in a vacuum system previously heated to a prescribed temperature, introducing a gas to a surface of the first substrate member, activating the gas to grow diamond crystals on the surface of the first substrate member, whereby a plurality of emitters comprising diamond crystals are formed on the surface, positioning the first substrate member with emitters to face a second substrate member having a surface, separating the first and second substrate members at a prescribed distance by a frame member, the distance between the emitters and the surface being substantially equal throughout, sealing inner surface perimeter portions of the first and second substrate members and the frame member to form an envelope, and drawing a vacuum within the envelope.

When an overvoltage that exceeds a fixed value is applied to the external electrode layers of the first substrate member and the second substrate member, significant electrostatic focusing takes place at the ends of the emitter cones on the cathode side. The quantum mechanics tunneling effect causes the electrons within the semiconductor to jump beyond the potential barrier and be discharged into the vacuum.

The discharged electrons are captured on the anode side, i.e., the inner surface (flat section) of the second substrate member. A leading discharge, in which current flows between the second substrate member and the first substrate member, is formed and then becomes a vacuum spark discharge (vacuum arc discharge).

This electric field electron discharge phenomenon will only take place once the electric field strength concentrated on the emitter cones increases to a prescribed amount. This means that current will flow between the electrodes only when a voltage at or beyond a prescribed value is applied to the electrodes.

Since the voltage applied to the electrodes is in a non-linear relationship to the current between the electrodes, surge absorbing properties are provided wherein the electrodes are made continuous only when an overvoltage exceeding the rating is applied.

In contrast to the speed of the electrons within the semiconductor, the electrons in the vacuum can move forward without scattering. Thus, this electric field electron discharge surge absorber operates extremely quickly.

Since this electric field electron discharge surge absorber does not have a junction between a p-type semiconductor and an n-type semiconductor, the problem of a large electrostatic capacity proportional to the size of the depletion layer does not come up at all as in silicon surge absorbers. The electrostatic capacity can be kept low enough that it can be ignored in practical applications.

Furthermore, the operating voltage (voltage rating) of the electric field electron discharge surge absorbing element can be easily set to a relatively high value by adjusting the sharpness (angle) of the emitter cone ends or by selecting the protective film material covering the surface.

Of course, it would also be possible to set the operating voltage to a relatively low value when necessary.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
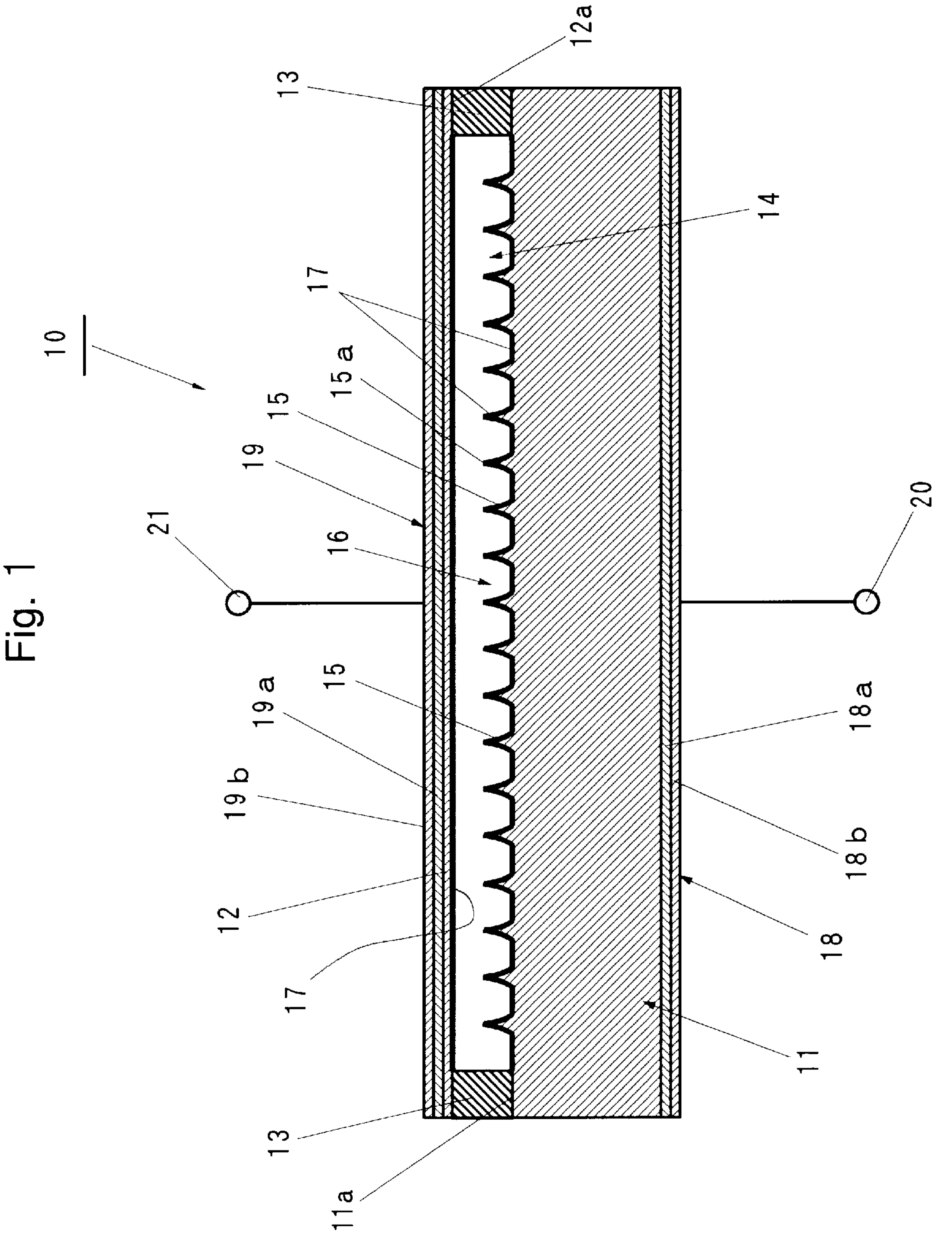
FIG. 1 is a cross-sectional view of the first electric field electronic discharge surge absorbing element according to the present invention.
Figure 2:
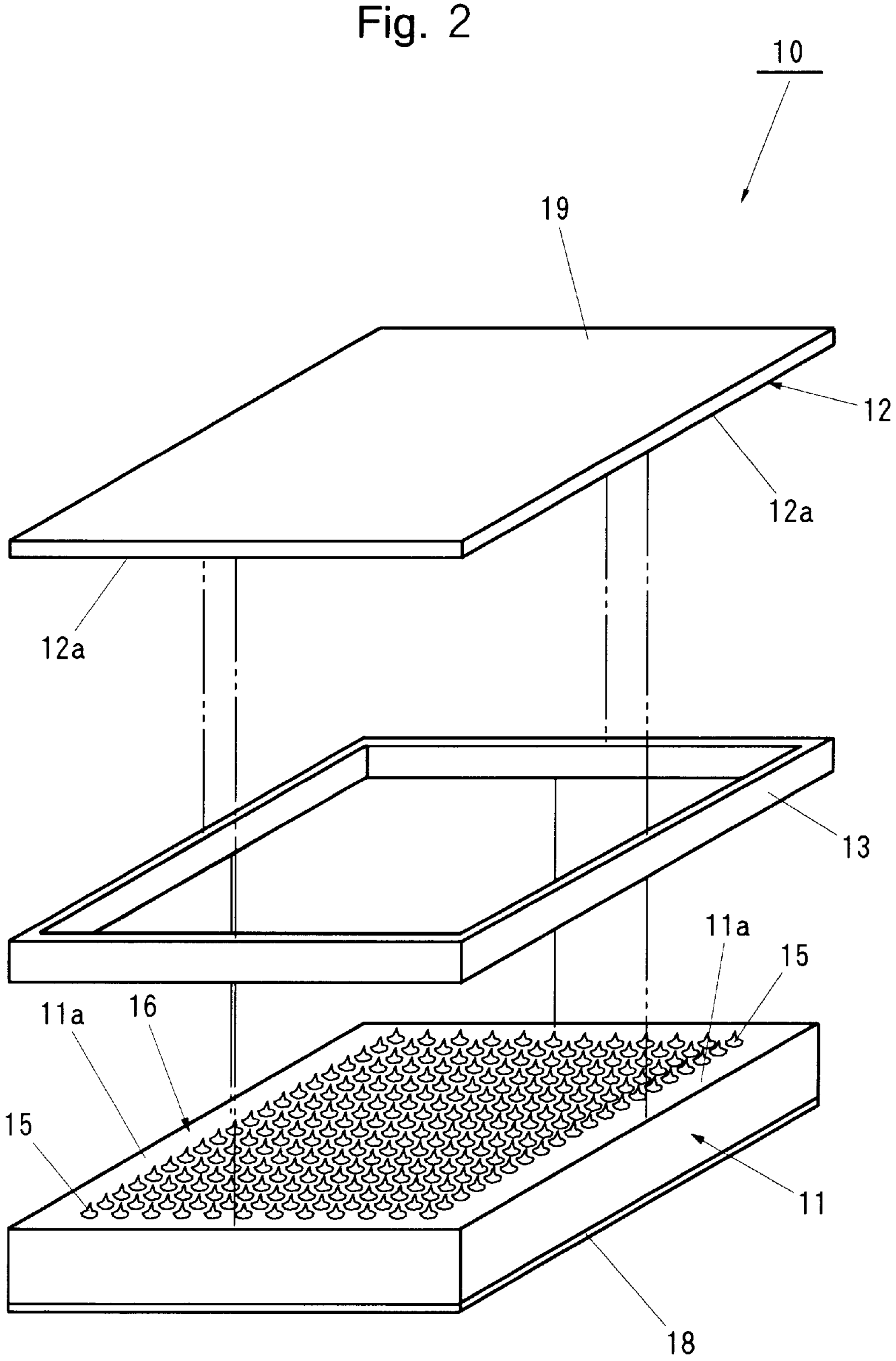
FIG. 2 is an exploded perspective view of a first electric field electron discharge surge absorbing element.

Referring to FIG. 1 and FIG. 2, there is shown a first electric field electron discharge surge absorbing element 10 according to the present invention. A first substrate member 11 and a second substrate member 12 are disposed facing each other, separated by a prescribed distance. A frame member 13 is interposed between an inner surface perimeter edge 11*a* of the first substrate member and an inner surface perimeter edge 12*a* of the second substrate member. Frame member 13, which also serves as a spacer, provides an air-tight seal and forms an envelope 14.

A high-vacuum state of $10^{-6}$–$10^{-8}$ Torr is maintained within envelope 14.

On the inner surface of first substrate member 11, a plurality of emitter cones 15 are arranged in a grid separated by a prescribed distance, forming an electron discharge portion 16.

First substrate member 11 is formed from an n-type semiconductor, in which impurities such as P or As are mixed into Si.

Similarly, emitter cones 15 are also formed from n-type semiconductor material and are formed integrally with first substrate member 11. Emitter cones 15 form cone shapes with sharp ends. Ends 15*a* are pointed toward the inner surface of second substrate member 12.

A prescribed distance is maintained between ends 15*a* of emitter cone 15 and the inner surface of second substrate member 12.

Emitter cones 15 have a height of approximately 5–15 microns and a bottom surface diameter of approximately 3–10 microns. The pitch between emitter cones 15 is approximately 7.5–15 microns. The angle of the ends is approximately 25–30 degrees.

A protective film 17 is formed on the inner surface of first substrate member 11, including the surface of emitter cones 15.

Protective film 17 can be a thin film comprising Nb, W, Mo, Cr, Ti, Th, Si, Ni, Lock arm, Ge, Al, or the like. Protective film 17 can also comprise a two-layer structure of W and Zr. Protective film 17 can also comprise a carbide, an oxide, a nitride, a boride, or an inorganic compound containing at least one of the above.

On the outer surface of first substrate member 11 is formed a first external electrode layer 18 comprising a first layer 18*a* and a second layer 18*b*. First layer 18*a* is formed by vaporizing Al. Second layer 18*b* is formed by vaporizing Ni on the surface of first layer 18*a*.

As in first substrate member 11, second substrate member 12 is formed from an n-type semiconductor. However, besides n-type semiconductor material, second substrate member 12 can comprise other material having a thermal expansion coefficient that is roughly equal to that of first substrate member 11, e.g., Mo.

Emitter cones 15 are not present on the inner surface of second substrate member 12, which comprises a flat portion.

A protective film 17 made from the same material that covers the surface of emitter cones 15 and the like is formed on the surface of the flat portion.

On the outer surface of second substrate member 12 is formed a second external electrode layer 19 comprising a first layer 19*a* and a second layer 19*b*. First layer 19*a* is formed by vaporizing Al, and second layer 19*b* is formed by vaporizing Ni on the surface of first layer 19*a*.

A cathode terminal 20 is connected to first external electrode layer 18, and an anode terminal 21 is connected to second external electrode layer 19.

Figure 42:
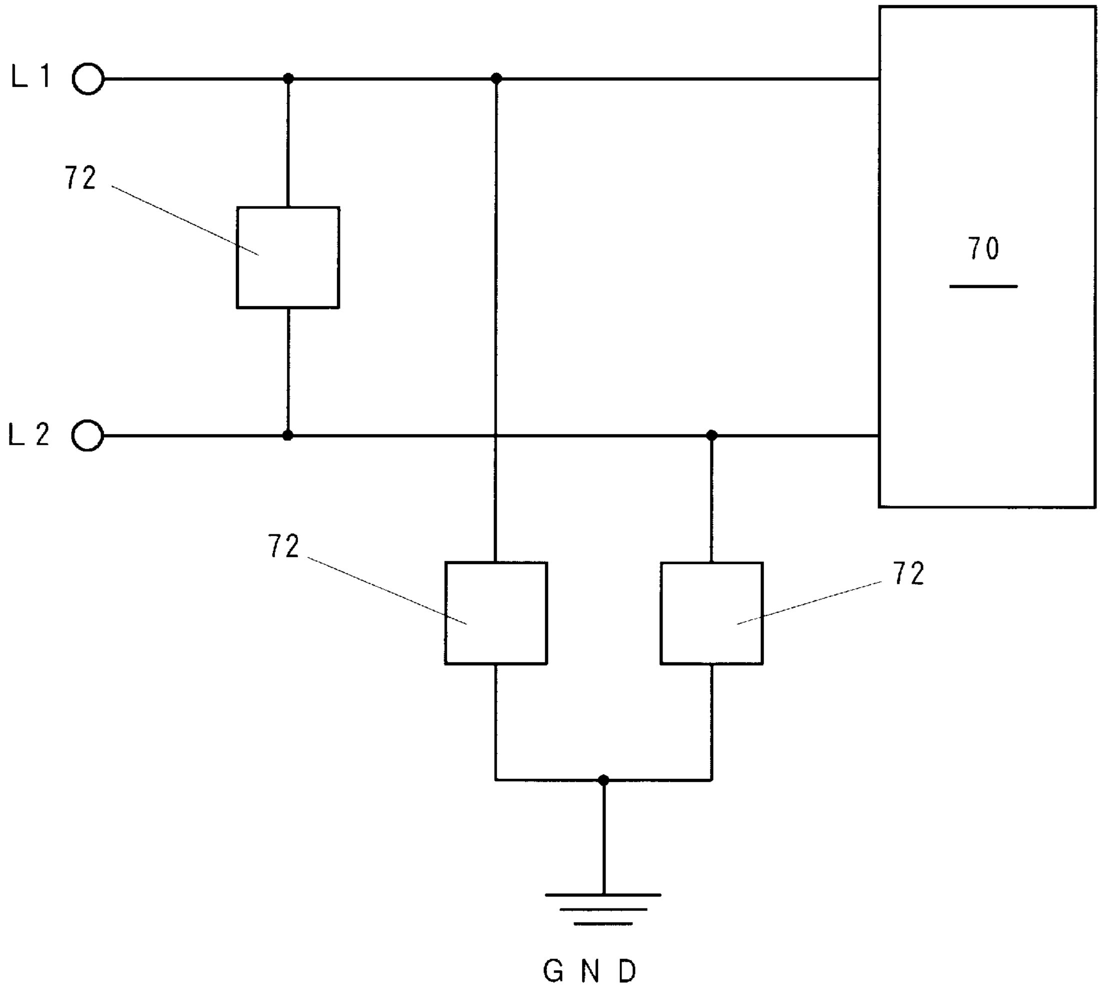
FIG. 42 is a circuit diagram showing the general manner in which surge absorbing elements are used.

By connecting these terminals to lines L1, L2, or to ground, first electric field electron discharge surge absorbing element 10 can be connected between lines L1, L2 or between lines L1, L2 and ground, as shown in FIG. 42.

When a surge voltage equal to or greater than the rating is applied between lines L1, L2 or between lines L1, L2 and ground, a strong electrostatic focus is generated at ends 15*a* of emitter cones 15. The quantum mechanical tunnel effect causes electrons from the n-type semiconductor to jump across the potential barrier and be discharged in the vacuum.

The discharged electrons are captured at the anode side, i.e. the inner surface (flat portion) of second substrate member 12. As a result, a leading discharge is generated between the inner surface of second substrate member 12 and emitter cone end 15*a*. This leading discharge becomes a vacuum spark discharge (vacuum arc discharge). This serves to absorb the surge.

The manner in which the leading discharge is transformed to a vacuum spark discharge can be as follows.

First, electron discharge due to the leading discharge causes an increase in the current density at emitter cone end 15*a,* which generates heat energy. This heat energy in turn generates metallic vapor from the metal contained in protective film 17, which covers the surface of emitter cone 15. Also, the electrons from the leading discharge collide with the inner surface of second substrate member 12, generating heat energy, which in turn generates metal vapor from the metal in protective film 17 covering the inner surface of second substrate member 12. The resulting charged metal vapor serves as the basis for forming a current, and a vacuum spark discharge is generated.

Second, in practical terms, it is difficult to form a complete vacuum in envelope 14, so there are trace amounts of gas molecules adhering to the surface of the material that forms the discharge space. These gas molecules are discharged in the space by the impact of the leading discharge, and the ionized gas molecules serve as the basis for forming a current.

Whether or not electric field electron discharge takes place or not depends on the extent of the vacuum around the electrodes, the work function of the material used in the cathode, the strength of the electric field applied to the cathode, and the distance between the cathode and the anode.

In the case of surge absorbing element 10, the operating voltage can be set freely over a wide range, such as around 10 volts to many thousands of volts. This can be done by controlling the degree of concentration of the electric field through adjusting the sharpness (angle) of emitter cone ends 1 Sa and adjusting the distance between emitter cone ends 15*a* and the inner surface of second substrate member 12.

Figure 3:
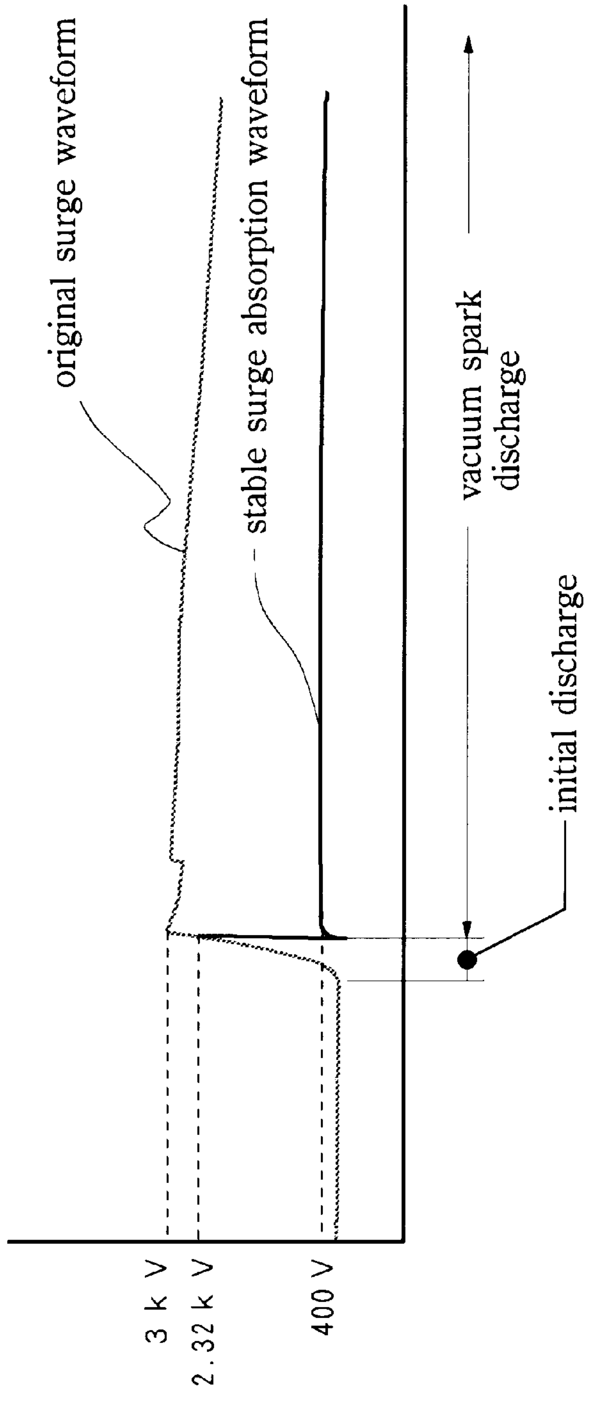
FIG. 3 is a waveform diagram showing the surge absorbing properties of the first electric field electronic discharge surge absorbing element.

Referring to FIG. 3, there is shown a graph illustrating the surge absorption properties when first electric field electron discharge surge absorbing element 10 is set for an operating voltage of 400 V. In this graph, the surge absorption waveform for an original surge waveform having a peak voltage of 3 kV is shown.

As shown in the graph, when the surge voltage is applied, a leading discharge having a peak of approximately 2.32 kV is generated immediately, after which a vacuum spark discharge is immediately formed and a stable surge absorption waveform at approximately 400 V is shown.

Referring to FIG. 1 and FIG. 2, the size of emitter cones 15 is exaggerated in order to facilitate the drawing. In fact, emitter cones 15 have a size on the order of microns, as described above, while first substrate member 11 has a size in the millimeters (e.g. 3–6 mm square). Anywhere from tens of thousands to hundreds of thousands of emitter cones are formed.

The overall size of first electric field electron discharge surge absorbing element 10 is 3–6 mm, and its thickness is around 0.6–1.5 mm.

First external electrode layer 18 and second external electrode layer 19 are not restricted to the two-layer structure of Al and Ni described above. For example, only Ni can be vaporized.

It would also be possible to apply phosphorous-based electrodeless Ni plating on the surface of the vaporized Ni.

Alternatively, palladium chloride can be used to activate the outer surfaces of first substrate member 11 and second substrate member 12. Then, phosphorous-based electrodeless Ni plating can be performed to form first external electrode layer 18 and second external electrode layer 19.

Frame member 13 can be bonded to first substrate member 11 and second substrate member 12 using various methods such as fusing using flint glass or the like, adhesing using a polyimide-based organic adhesive agent, or positive-pole bonding.

In particular, positive-pole bonding does not require any draining of gasses from inside envelope 14 after the bonding operation since no excess gas is generated during bonding.

Figure 4:
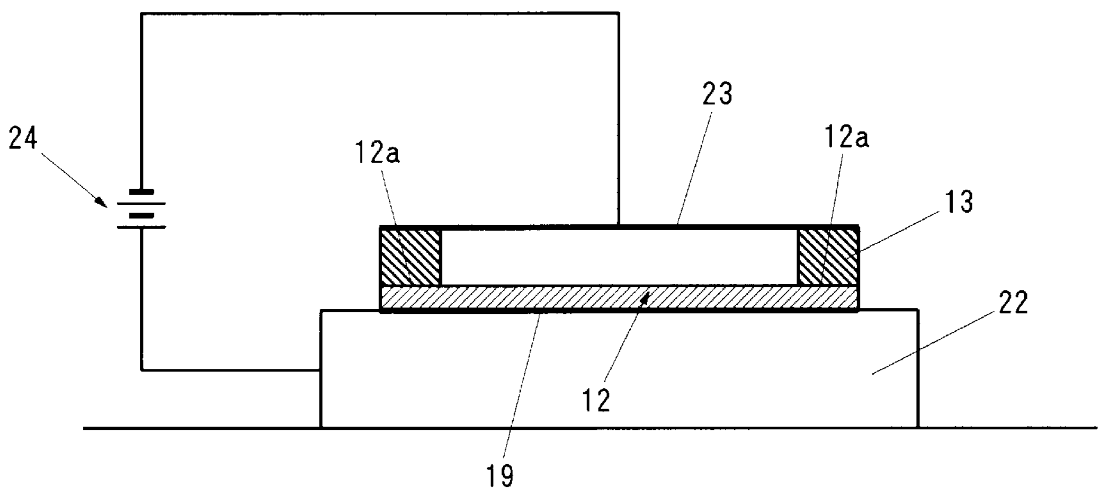
FIG. 4 is a schematic cross-sectional view, illustrating the bonding process between the second substrate member and the frame member in the first electric field electron discharge surge absorbing element.
Figure 5:
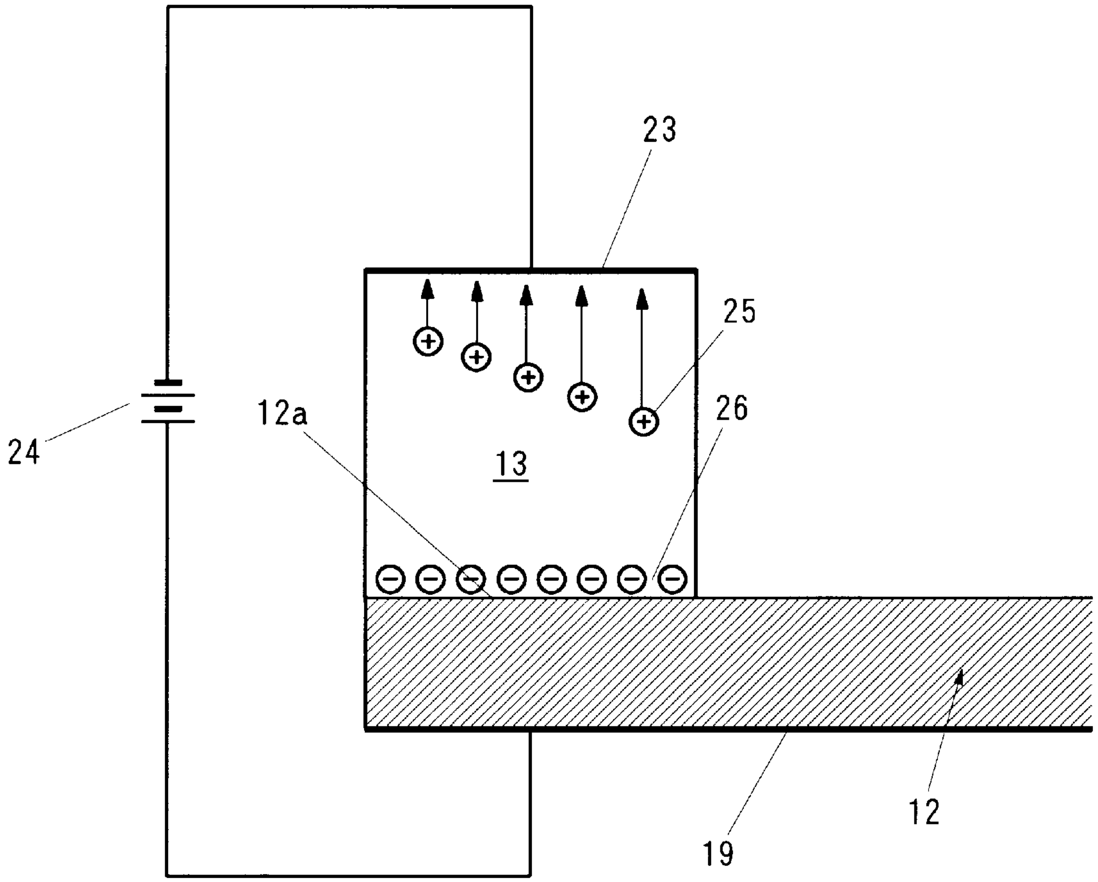
FIG. 5 is a schematic drawing showing the principles behind the bonding between the second substrate member and the frame member in the first electric field electron discharge surge absorbing element.
Figure 6:
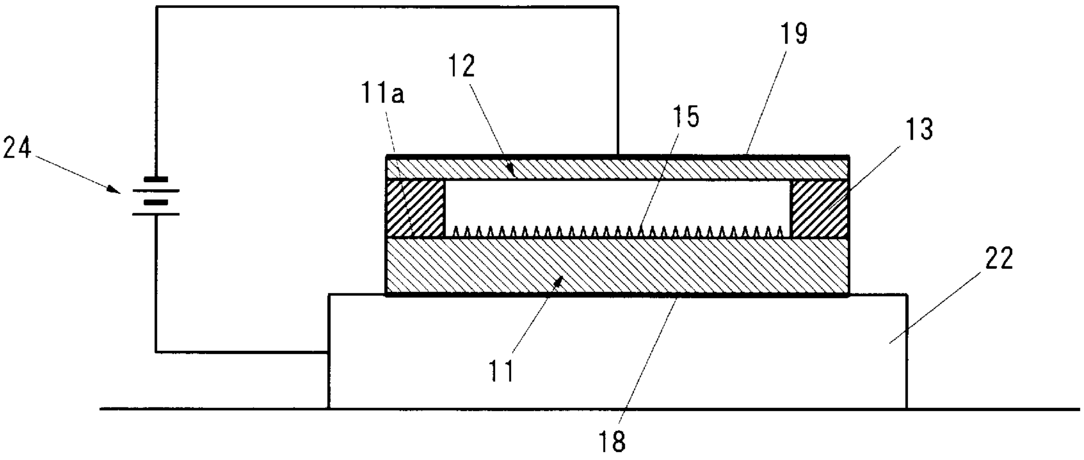
FIG. 6 is a schematic cross-section drawing showing the bonding process between the first substrate member and the frame member of the first electric field electron discharge surge absorbing element.

Referring to FIG. 4 through FIG. 6, the following is a description of the steps involved in forming envelope 14 using the positive-pole bonding method.

Referring to FIG. 4, second substrate member 12 is mounted on hot plate 22 so that second external electrode layer 19 is on the bottom. An end surface of frame member 13 is placed on inner surface perimeter portion 12*a* of second substrate member 12.

In this case, frame member 13 comprises borosilicate glass containing mobile ions ($Na^+$) (commercial name: Pyrex glass).

An electrode plate 23 is pressed onto the other end surface of frame member 13. Electrode plate 23 is formed with a shape corresponding to the shape of the end surface of frame member 13. An insulating member can be interposed between electrode plate 23 and the end surface of frame member 13.

The positive side of a direct current power supply 24 is connected to second external electrode layer 19 of second substrate member 12 via hot plate 22. The negative side of direct current power supply 24 is connected to electrode plate 23.

Hot plate 22 heats second substrate member 12 and electrode plate 23 to 200–600° C., and direct current power supply 24 applies 50–1000 V of direct current voltage.

Referring to FIG. 5, after a fixed time has elapsed, positive ions 25 ($Na^+$) move to the negative side (i.e., near the upper end surface of frame member 13). A negative load is concentrated near inner surface perimeter portion 12*a* of second substrate member 12, and a space-charge layer 26 is created. Chemical bonding accompanied by a large suction force takes place, resulting in positive-pole bonding.

The steps described above form a strong bond between inner surface perimeter portion 12*a* of second substrate member 12 and one end of frame member 13. Referring to FIG. 6, first substrate member 11 is mounted on hot plate 22 with first external electrode layer 18 on the bottom. The remaining end of frame member 13 is placed in contact with inner surface perimeter portion 11*a* of first substrate member 11.

The positive side of direct current power supply 24 is connected to first external electrode layer 18 of first substrate member 11 via hot plate 22. The negative side of direct current power supply 24 is connected to second external electrode layer 19 of second substrate member 12.

Hot plate 22 heats first substrate member 11 and frame member 13 to a temperature of 200–600° C., and direct current power supply 24 applies a voltage of 50–1000 V.

Based on the same operations as the ones described above, a strong positive-pole bond is formed between first substrate member 11 and the end surface of frame member 13, resulting in a tightly sealed envelope 14.

Since this positive-pole bonding does not involve fused glass or adhesive agents, a greater degree of precision can be achieved for the positioning of first substrate member 11, second substrate member 12, and frame member 13. Furthermore, this method has the advantage of not requiring a step for draining gas after bonding.

When second substrate member 12 comprises Mo, a bonding method other than positive-pole bonding, such as fusing or adhesing, must be used.

Referring to FIG. 7 through FIG. 15, the following is a description of the method used to form emitter cones 15.

Figure 7:
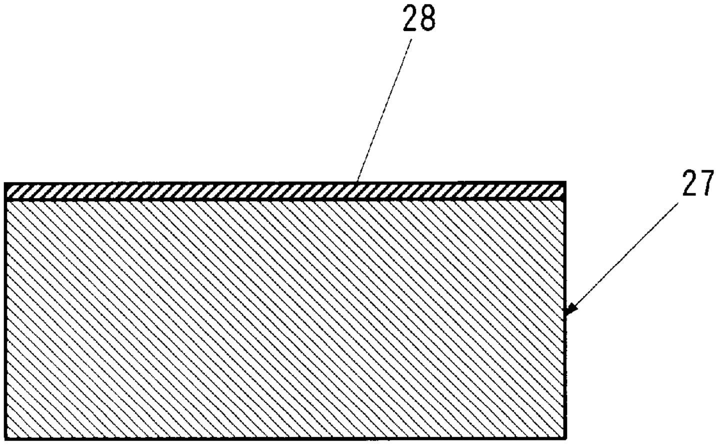
FIG. 7 is a cross-sectional view of the process for forming the emitter cones, showing the substrate on which emitter cones are formed.

First, the surface of an n-type Si substrate 27 having a specific resistance of 0.01–5 ohm-cm is oxidized, and an $SiO_2$ film 28 having a thickness of 150–3000 Angstroms is formed (FIG. 7).

Figure 8:
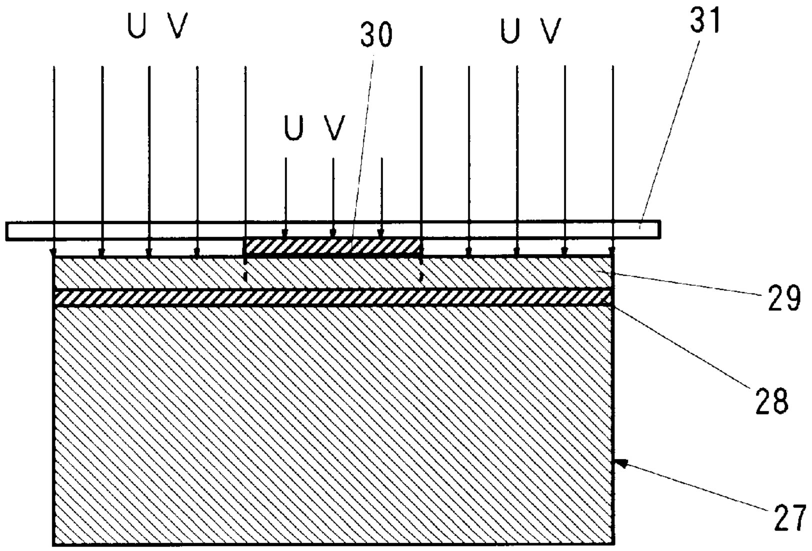
FIG. 8 is a cross-sectional view of the process for forming the emitter cones, showing application of a photoresist.

Then, a photoresist 29 is applied uniformly over the entire surface of $SiO_2$ film 28 (FIG. 8).

Photoresist 29 is covered with a photo mask 31 on which an opaque coating 30 is applied in the shape of a circle. This is then exposed to ultraviolet rays.

As a result, the surface of photoresist 29 is sensitized except for the section for which the ultraviolet rays were blocked, defined by opaque coating 30.

Figure 9:
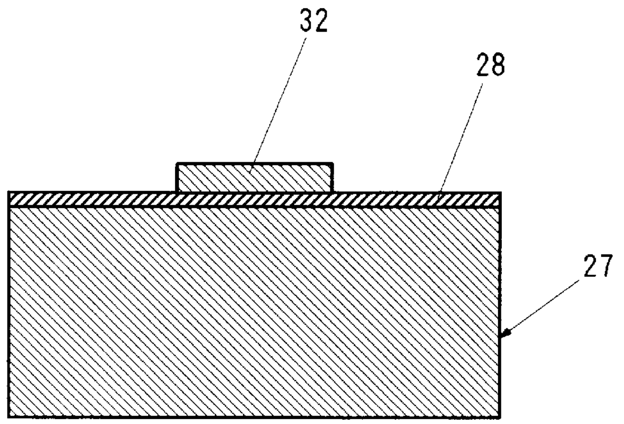
FIG. 9 is a cross-sectional view of the process for forming the emitter cones, showing formation of a photoresist mask.

Next, prescribed chemicals are used to remove the sensitized portions of photoresist 29, and a circular photoresist mask 32 is formed on the surface of $SiO_2$ film 28 (FIG. 9).

Figure 10:
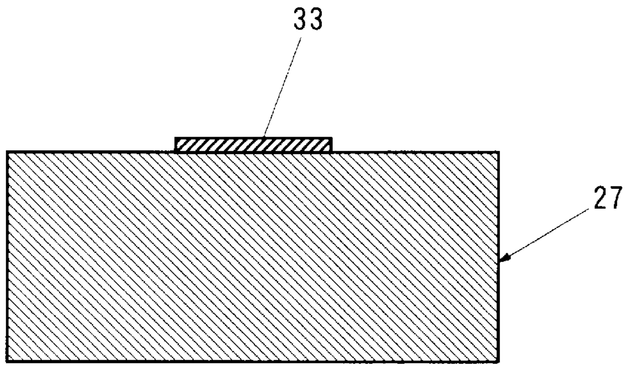
FIG. 10 is a cross-sectional view of the process for forming the emitter cones, showing formation of a oxidized film mask.

Next, BHF (wet etching performed with buffered hydrofluoric acid) is used to remove the portions of $SiO_2$ film 28 that is not covered by photoresist mask 32. Photoresist mask 32 is then removed, resulting in a circular oxidized film mask 33 (FIG. 10).

In the drawing, only one oxidized film mask 33 is shown. However, oxidized film masks 33 are formed to correspond to the number of emitter cones 15. In practice, a plurality of oxidized film masks 33 is arranged in a dot-matrix pattern separated by 15-micron intervals.

The diameter of oxidized film mask 33 is set to approximately 3–10 microns.

Figure 11:
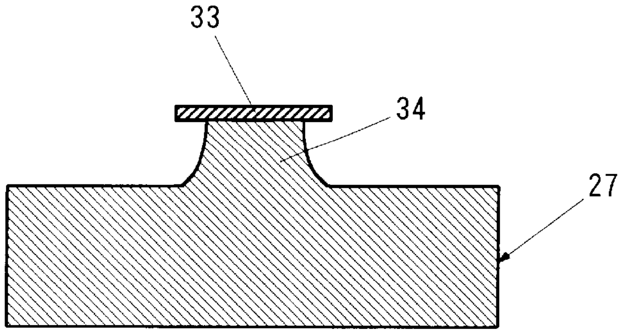
FIG. 11 is a cross-sectional view of the process for forming the emitter cones, showing the surface of the Si substrate after RIE.

RIE (reactive ion etching) is then performed on the surface of Si substrate 27. The portions that are not covered by oxidized film mask 33 are etched away (FIG. 11).

In the RIE operation, Si substrate 27 is disposed between two parallel electrodes in a vacuum chamber. The vacuum chamber is filled with a prescribed gas medium, and approximately 150 W of electricity is applied to the electrodes. A high-frequency plasma discharge is generated. The chemical actions caused by the plasma and the physical actions caused by ion impact are used to perform etching.

In this case, reactive $O_2$ and $SF_6$ would be desirable for the gas medium. The relative volumes of the two could be set, for example, to $SF_6$:$O_2$=9:1 under a pressure of $2.2\times10^{-1}$ Torr.

Figure 12:
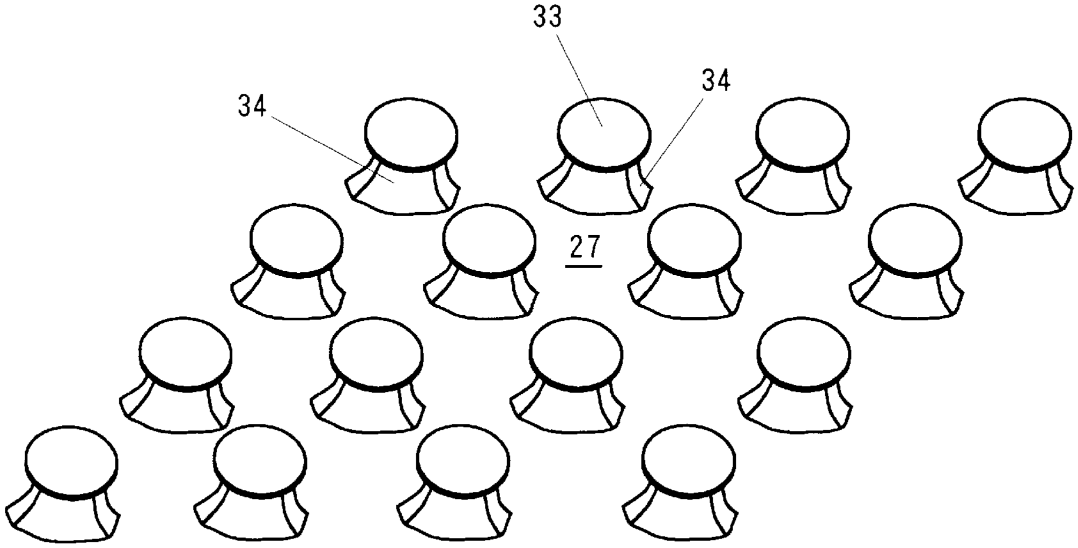
FIG. 12 is a perspective drawing showing the process for forming the emitter cones.

Since RIE has good anisotropic properties, there is a relatively low degree of "undercutting", where etching takes place on the back side of oxidized film mask 33. As a result, a projection 34 is formed in the shape of a rectangular pillar (FIG. 12).

Under the conditions described above, the RIE operations can be performed over a time span of approximately 15 minutes.

It would also be possible to perform RIE on the surface of Si substrate 27 in multiple stages involving different pressure conditions.

For example, RIE could be performed for 36 minutes under a pressure of $1.1\times10^{-1}$ Torr. Then, RIE could be performed for 10 minutes under a pressure of $2.2\times10^{-1}$ Torr.

When RIE is performed under high pressures, the chemical actions are strengthened, and etching along the width of projection 34 is accelerated. Under low pressures, the physical actions are strengthened, and etching along the height of projection 34 is accelerated.

Thus, the shape of projection 34 can be controlled by combining multiple RIE stages involving different pressure conditions, as described above.

Figure 13:
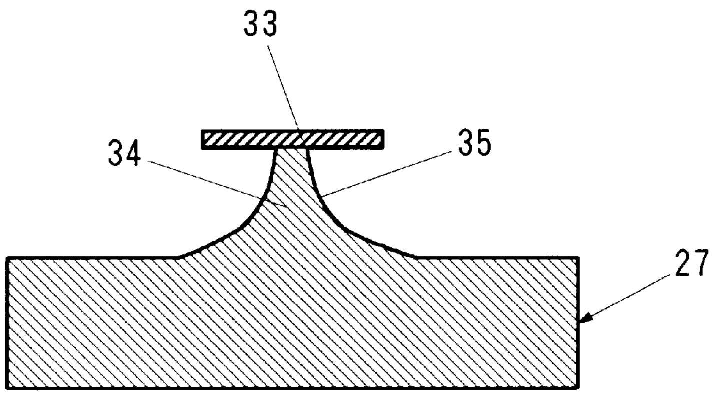
FIG. 13 is a cross-sectional view of the process for forming the emitter cones, showing the surface of the Si substrate after RIE and anisotropic wet etching.

Next, anisotropic wet etching is performed on the surface of Si substrate 27, so that the surface of projection 34 is etched and the end is made sharp (FIG. 13).

In general, wet etching is performed by immersing the item to be etched in prescribed chemicals, with the etching resulting from the chemical reactions. Thus, there is strong isotropy (i.e., the direction of etching is difficult to control and over-etching can occur easily).

In contrast, anisotropic wet etching allows wet etching with less pronounced isotropy through careful selection of the etching fluids. This provides more control over the etching direction.

In this case, an aqueous solution mixture of KOH and $H_2O$ is used as the anisotropic wet etching fluid. The solution temperature is set to about 50° C. The ratio of the mixture can be, for example, 50 g of KOH to 100 ml of $H_2O$.

Figure 14:
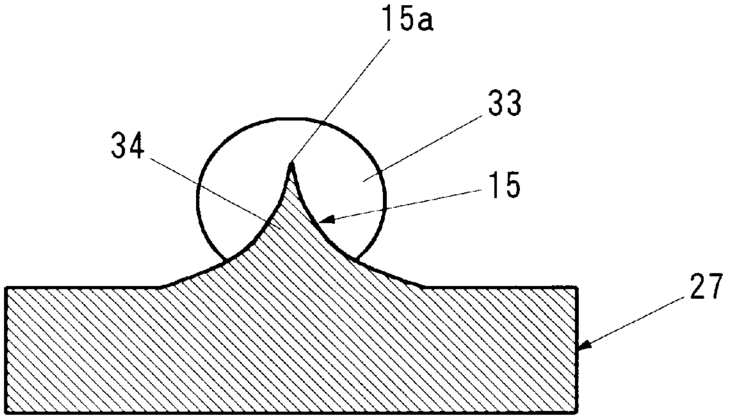
FIG. 14 is a partial cross-section drawing showing the process for forming emitter cones.
Figure 15:
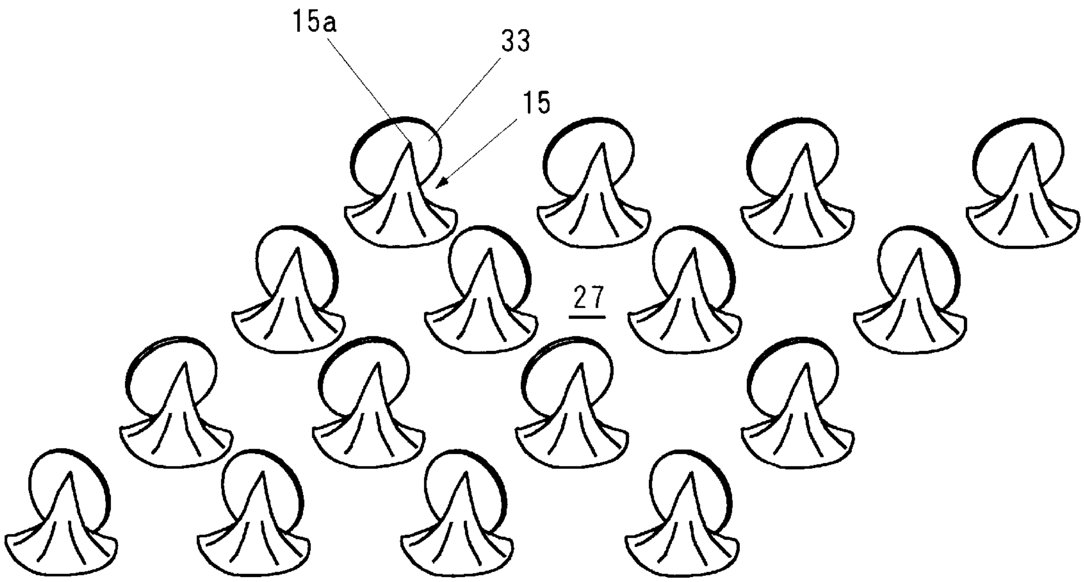
FIG. 15 is a partial perspective drawing showing the process for forming emitter cones, wherein the oxidized film masks have fallen off.

As the anisotropic wet etching proceeds, an undercut 35 is formed, thus sharpening the end of projection 34. Oxidized film mask 33 loses its stability and drops down (FIG. 14 and FIG. 15).

Once this stage has been reached, the end of projection 34 has been sharpened to an angle of 25–30 degrees, thus forming a complete emitter cone 15. At this point, the anisotropic wet etching is halted.

The time required for the anisotropic wet etching to reach this stage is expected to be approximately 30–38 seconds.

By forming emitter cone 15 in the manner described above, a very sharp end 15*a* can be formed. This makes it possible to set the operating voltage of first electric field electron discharge surge absorbing element 10 to a relatively low value based on its application.

Figure 16:
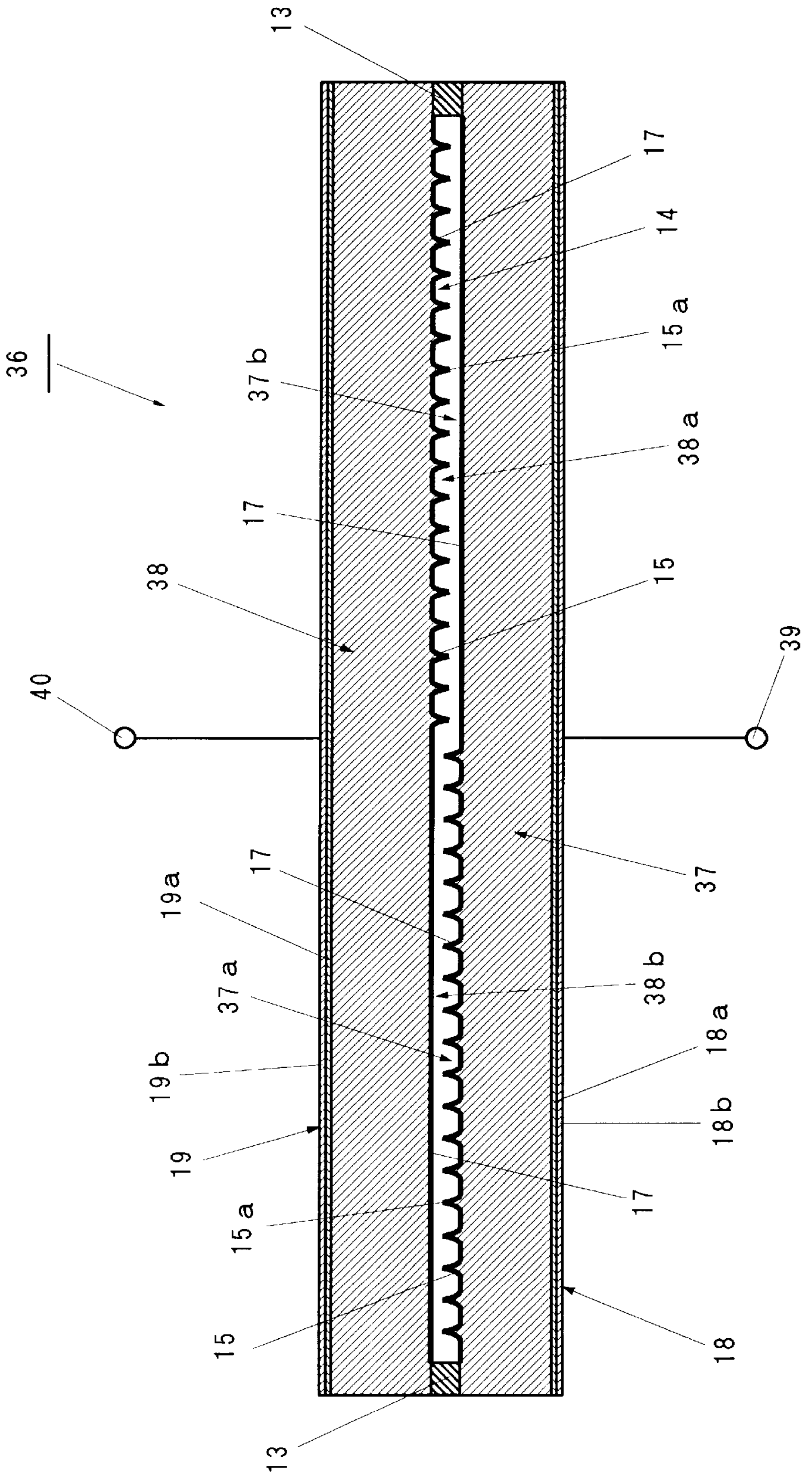
FIG. 16 is a cross-section drawing showing the second electric field electron discharging surge absorbing element according to the present invention.

Referring to FIG. 16, there is shown a second electric field electron discharge surge absorbing element 36 according to the present invention. Second surge absorbing element 36 comprises envelope 14, which is formed by: disposing an n-type semiconductor third substrate member 37 and a fourth substrate member 38 so that the two members are facing each other and separated by a prescribed distance; and providing an air-tight seal for the inner surface perimeters of the two members using frame member 13. The space inside envelope 14 has a high vacuum of $10^{-5}$–$10^{-8}$.

The inner surface of third substrate member 37 comprises two portions: a first electron discharge portion 37*a,* on which a plurality of emitter cones 15 is disposed in a dot-matrix pattern; and a first flat portion 37*b*, which is kept flat and on which no emitter cones 15 are formed.

The inner surface of fourth substrate member 38 also comprises two portions: a second electron discharge portion 38*a,* on which a plurality of emitter cones 15 is disposed in a dot matrix pattern; and a second flat portion 38*b,* which is kept flat and on which no emitter cones 15 are formed.

The two substrate members are positioned so that first electron discharge portion 37*a* of third substrate member 37 and second electron discharge portion 38*a* of fourth substrate member 38 are facing each other, and so that second electron discharge portion 38*a* of fourth substrate member 38 and first flat portion 37*b* of third substrate member 37 are facing each other.

A prescribed distance is maintained between ends 15*a* of the emitter cones and flat portions 37*b*, 38*b*.

A protective film 17, made from the same material used in first electric field electron discharge surge absorbing element 10, is formed on the inner surface of third substrate member 37 and the inner surface of fourth substrate member 38.

As in first electric field electron discharge surge absorbing element 10, a first external electrode layer 18 is formed on the outer surface of third substrate member 37. First external electrode layer 18 is formed with a two-layer structure comprising a first layer 18*a*, and a second layer 18*b*. A first external terminal 39 is connected to first external electrode layer 18.

As in first electric field electron discharge surge absorbing element 10, a second external electrode layer 19 is formed on the outer surface of fourth substrate member 38. Second external electrode layer 19 is formed with a two-layer structure comprising a first layer 19*a* and a second layer 19*b*. A second external terminal 40 is connected to second external electrode layer 19.

As described above, second electric field electron discharge surge absorbing element 36 is characterized in that emitter cones 15 are formed on both third substrate member 37 and fourth substrate member 38.

As a result, electrons can be discharged to both sides. This allows connection to be made to a circuit without concern for polarity.

A further advantage is that an overvoltage can be absorbed even if it is applied in the reverse direction.

Second electric field electron discharge surge absorbing element 36 also provides bonding between third substrate member 37 and frame member 13 and bonding between fourth substrate member 38 and frame member 13 using the positive-pole bonding method.

Emitter cones 15 can be formed using the RIE and anisotropic wet etching method described above.

Figure 17:
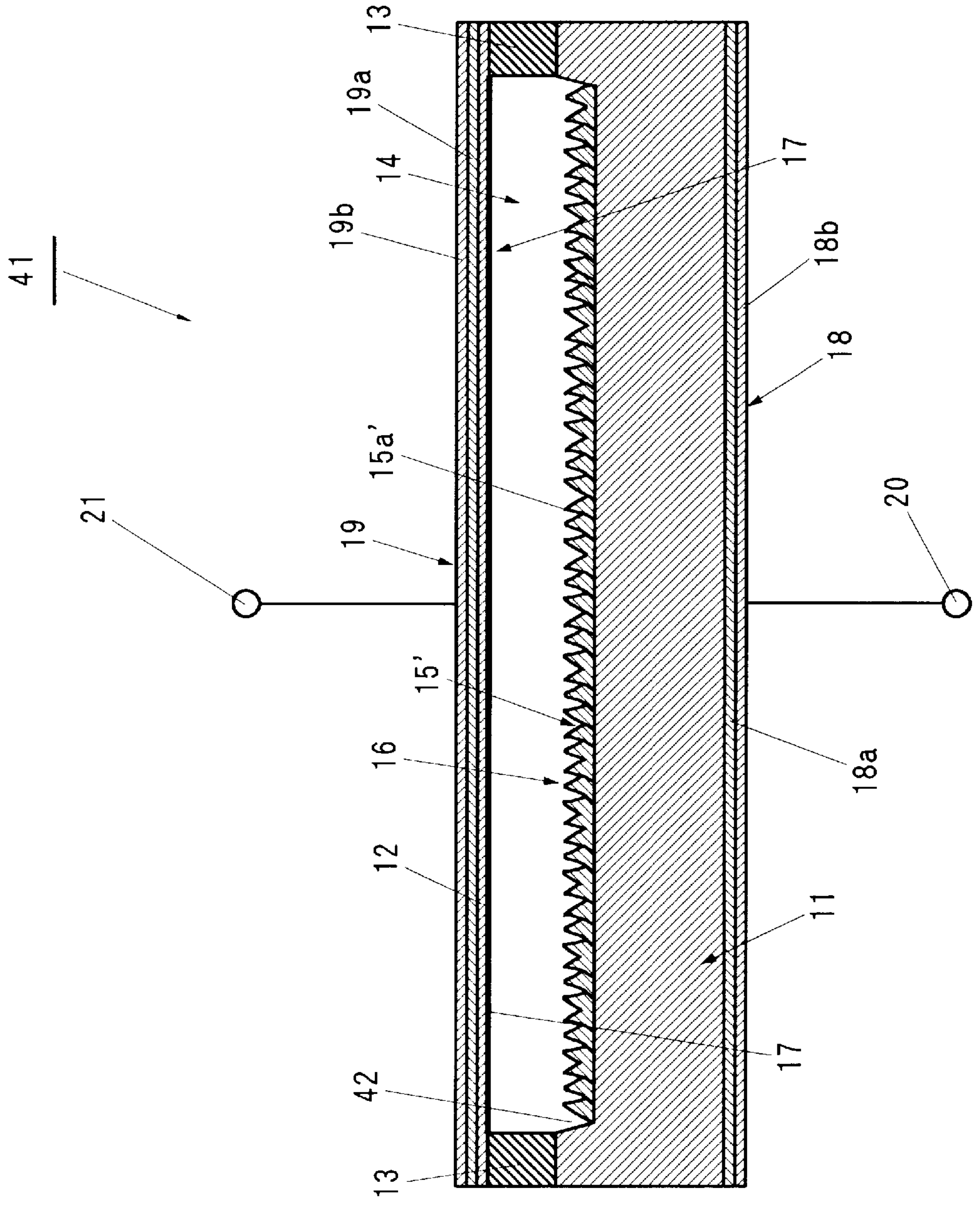
FIG. 17 is a cross-section drawing showing the third electric field electron discharging surge absorbing element according to the present invention.

Referring to FIG. 17, there is shown third electric field electron discharge surge absorber 41.

In third electric field electron discharge surge absorber 41, a cavity 42 having a depth of several microns is formed on the inner surface of first substrate member 11. A plurality of emitter cones 15' formed on the bottom surface of cavity 42 using fine diamond crystals serves as an electron discharge portion 16. Otherwise, the structure of third electric field electron discharge surge absorber 41 is essentially identical to that of first electric field electron discharge surge absorbing element 10.

The following is a description concentrating on the characteristics of third electric field electron discharge surge absorber 41, with descriptions of the sections overlapping with first electric field electron discharge surge absorbing element 10 omitted.

Emitter cones 15 are formed by growing diamond crystals on the bottom surface of cavity 42 over approximately the entire bottom surface.

Undoped diamond crystals which do not contain any impurities are intrinsic semiconductors. However, in emitter cones 15', the diamond crystals are formed as n-type semiconductors by mixing in prescribed amounts of impurities such as P, N, or C, during the growth process.

The shape of each emitter cone 15' is based on the natural geometry of diamonds (i.e., a rectangular cone with a pointed end). Pointed end 15*a*' is pointed toward the inner surface (flat portion) of second substrate member 12.

A prescribed distance is maintained between ends 15*a*' of the emitter cones and the inner surface of second substrate member 12.

The average height of emitter cones 15' is set to approximately 5 microns. Protective film 17 is formed only over second substrate member 12 and does not cover the surface of emitter cone 15'.

The diamond crystals have a negative electron affinity. In other words, the band is bent so that the Fermi level on the surface matches the bottom of the conductive band, resulting in a low work function.

When a voltage exceeding a prescribed amount is applied to external electrode layers 18, 19, an electric field concentration takes place at ends 15*a*' of emitter cones 15'. Electron discharge takes place at a relative low applied voltage even without the use of the tunnel effect. A high current density is also obtained. Thus, the operating voltage of third electric field electron discharge surge absorber 41 can be easily set to a relatively low value as appropriate for the application.

Diamonds are stable at high temperatures, and can withstand heat up to 1100° C.

Also, since they are the hardest material on earth, they are resistant to sputtering. The sputtering rate can be lowered to approximately 1/7th the sputtering rate of that used when emitter cones 15 are formed using silicon semiconductors. This provides a dramatic improvement in the durability of the electric field electron discharge surge absorbing element.

Referring to FIG. 18–FIG. 26, the following is a description of how emitter cones 15 are formed from diamond crystals.

Figure 18:
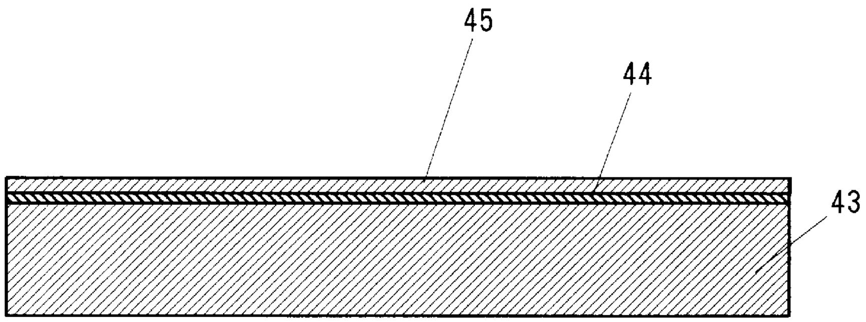
FIG. 18 is a cross-sectional view of the process for forming the diamond crystal emitter cones, showing application of a photoresist.

First, an n-type Si substrate 43 having a specific resistance of 0.01–5 ohm-cm is oxidized in an oxidizing atmosphere to form an $SiO_2$ film 44 on the surface having a thickness of 150–3000 Angstroms. Then, a photoresist 45 is uniformly applied over the entire surface of $SiO_2$ film 44 (FIG. 18).

Figure 19:
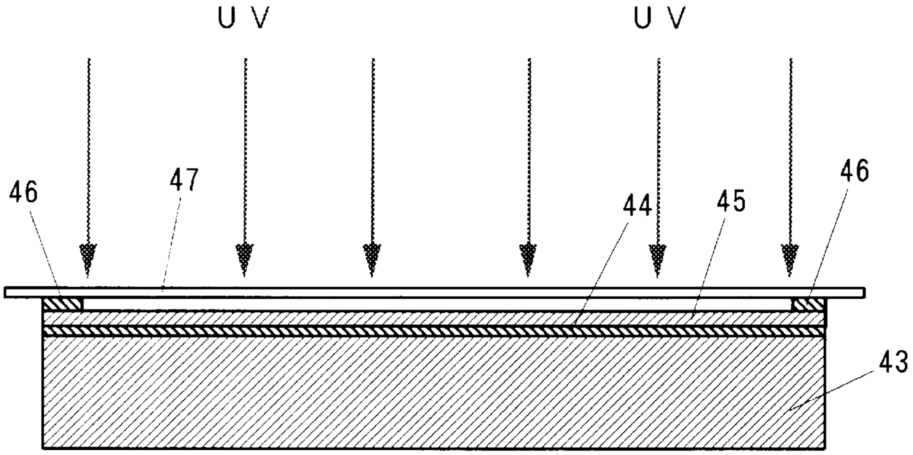
FIG. 19 is a cross-sectional view of the process for forming the diamond crystal emitter cones, showing application of ultraviolet rays to the photoresist of FIG. 18.

Then, a photomask 47 having a frame-shaped shielding pattern 46 is covered over photoresist 45, and ultraviolet exposure is performed (FIG. 19).

Figure 20:
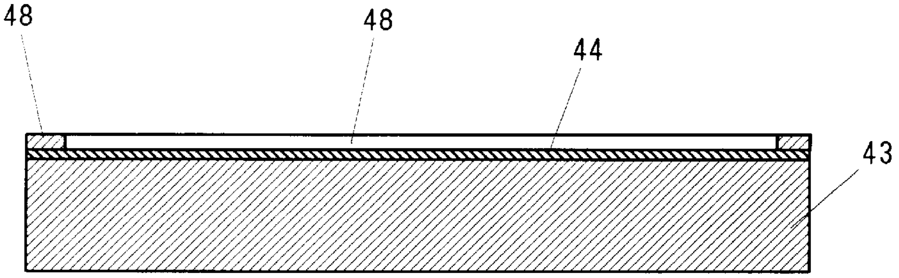
FIG. 20 is a cross-sectional view of the process for forming the diamond crystal emitter cones, showing formation of a film mask.

The exposure causes the entire surface of photoresist 45 to be sensitized except for the portions from which the ultraviolet rays are blocked by pattern 46. Next, a prescribed chemical is used to eliminate the portions of photoresist 45 that are sensitized. This results in a frame-shaped photoresist mask 48 on the surface of $SiO_2$ film 44 (FIG. 20).

Figure 21:
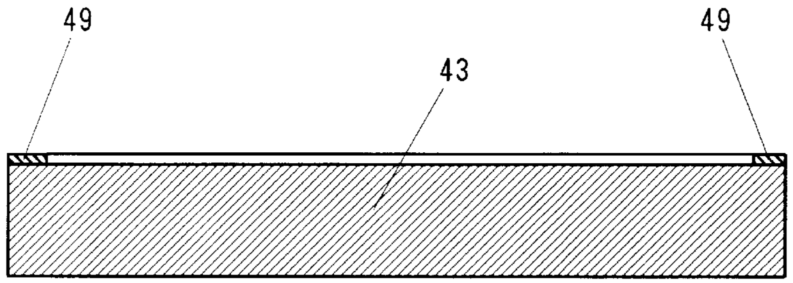
FIG. 21 is a cross-sectional view of the process for forming the diamond crystal emitter cones, showing formation of an oxidized film mask.

Next, BHF is used to remove the portions of $SiO_2$ film 44 not covered by photoresist mask 48. Photoresist mask 48 is peeled away to form a frame-shaped oxidized film mask 49 along the perimeter of the surface of Si substrate 43 (FIG. 21).

Figure 22:
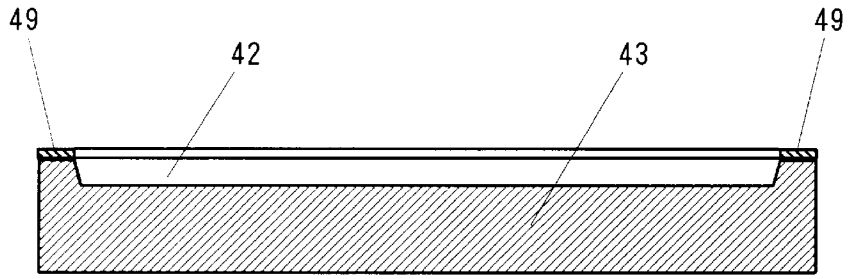
FIG. 22 is a cross-sectional view of the process for forming the diamond crystal emitter cones, showing the surface of the Si substrate after RIE.
Figure 23:
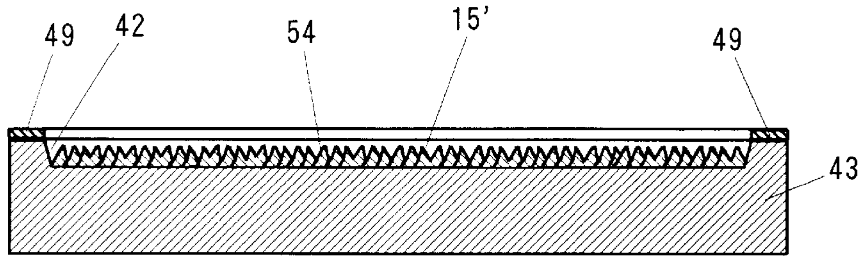
FIG. 23 is a cross-sectional view of the process for forming the diamond crystal emitter cones, showing diamond crystals grown on the bottom surface of the cavity.

Next, RIE is performed on the surface of Si substrate 43, and the portions not covered by oxidized film mask 49 is etched to the necessary depth to form cavity 42 (FIG. 22). The RIE operation preferably uses Freon as the gas medium. Next, with oxidized film mask 49 left in place, diamond crystals are grown on the bottom surface of cavity 42 to form emitter cones 15' (FIG. 23).

Various methods are currently used today to form diamond crystals under low pressures. The following description will cover hot-filament CVD and microwave plasma CVD, which are particularly prominent methods.

First, the hot-filament CVD method will be described.

Figure 24:
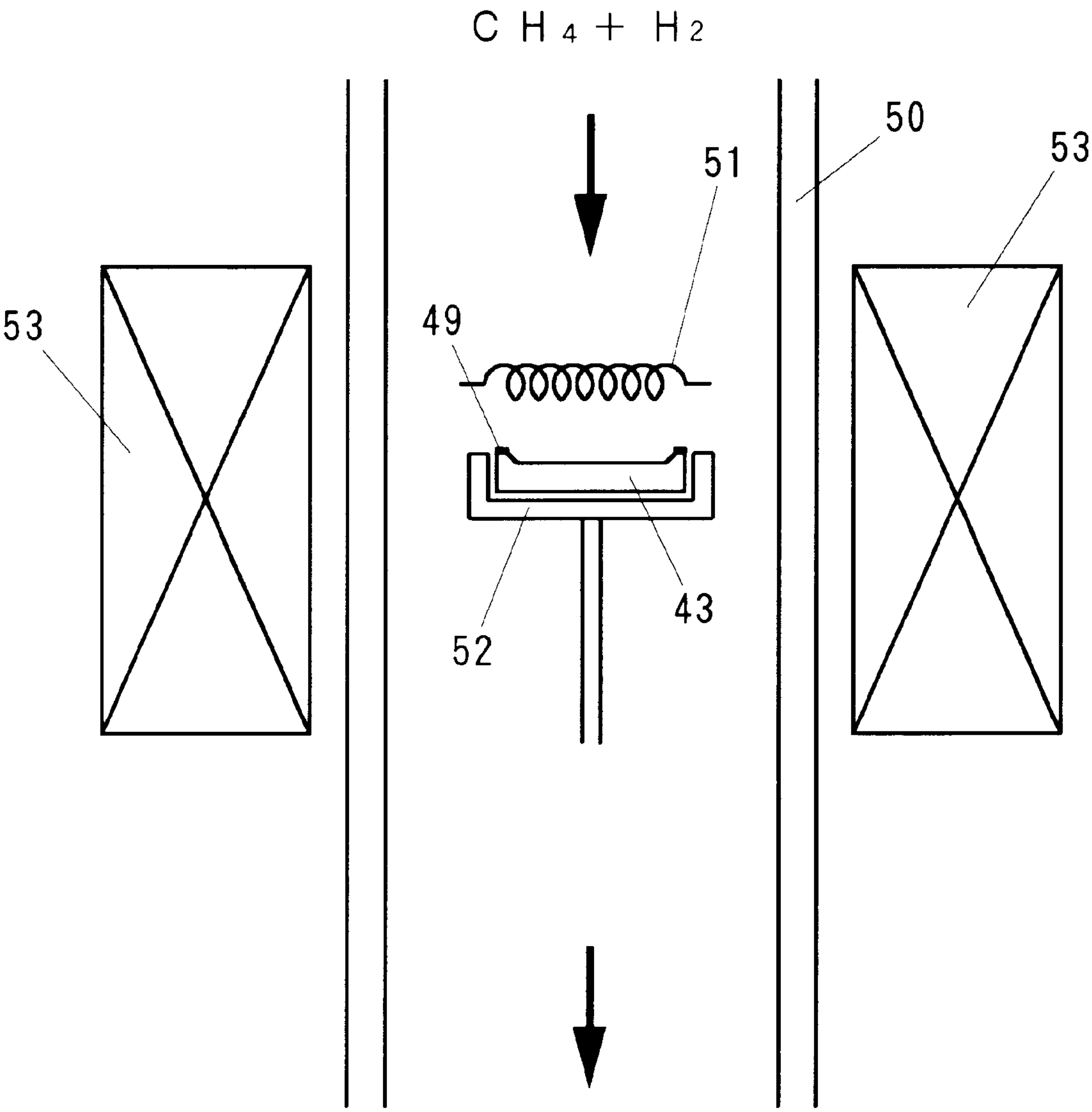
FIG. 24 is a schematic drawing illustrating the hot-filament CVD method for diamond crystal formation.

Referring to FIG. 24, a silica tube 50 is disposed within a vacuum container (not shown in the drawing). Inside silica tube 50, there is disposed a tungsten filament 51 and a substrate holder 52. Si substrate 43 is disposed on the surface of substrate holder 52.

Next, filament 51 is heated to around 2000° C. or higher, and an electric furnace 53 disposed around silica tube 50 is heated to 600–1000° C. A gaseous mixture of $CH_4$ (methane) and $H_2$ is introduced from the upper portion of silica tube 50.

This gaseous mixture is broken down and excited (activated) by the heat from filament 51, generating radical bases ($CH_3$, CH, $C_2$) and hydrogen molecules (H). These carbon radicals become diamond crystals on Si substrate 43.

Also, the diamond crystals can be turned into n-type semiconductors by mixing impurity gasses such as $PH_3$, $NH_3$, and $N_2$ to the gaseous mixture of $CH_4$ and $H_2$.

The pressure inside the vacuum container is set within a range of a few kPa to less than a hundred kPa.

Figure 25:
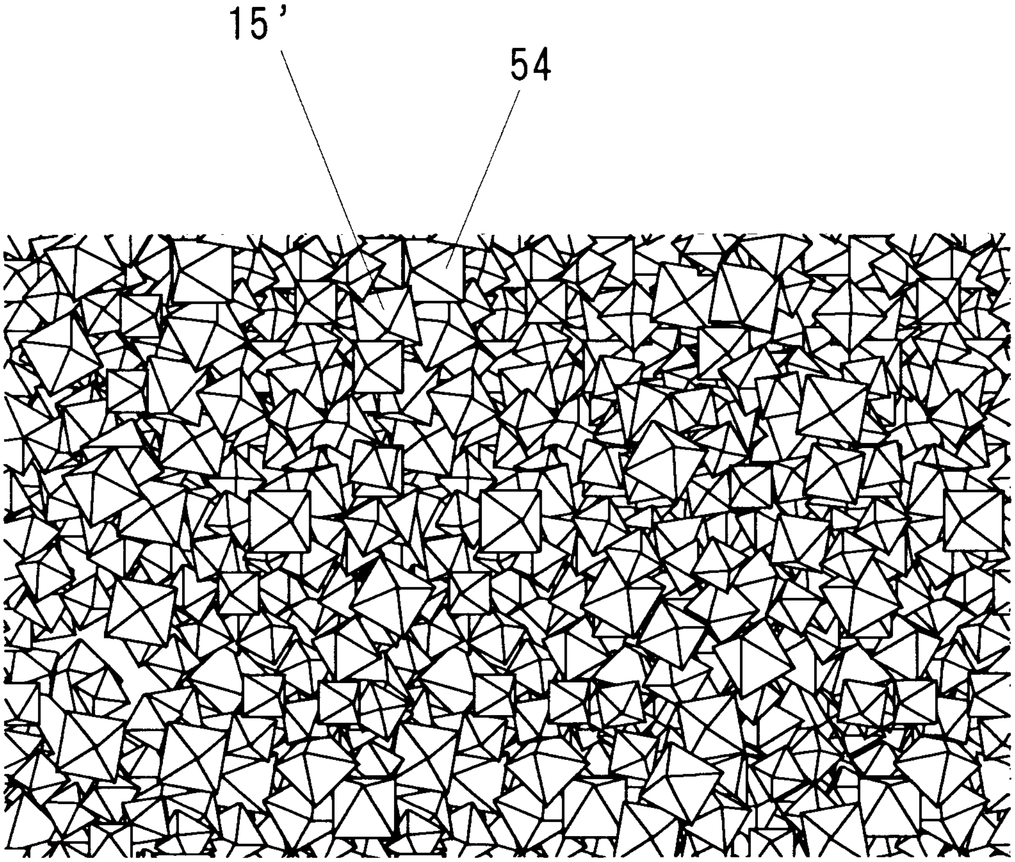
FIG. 25 is an image drawing of diamond crystals grown by the hot-filament CVD method.

Referring to FIG. 25, when this hot-filament CVD method is used, diamond particles 54 having sizes of several microns grow in an overlapping manner on the surface of Si substrate 43, thus forming emitter cones 15'.

The following is a description of the microwave plasma CVD method.

Figure 26:
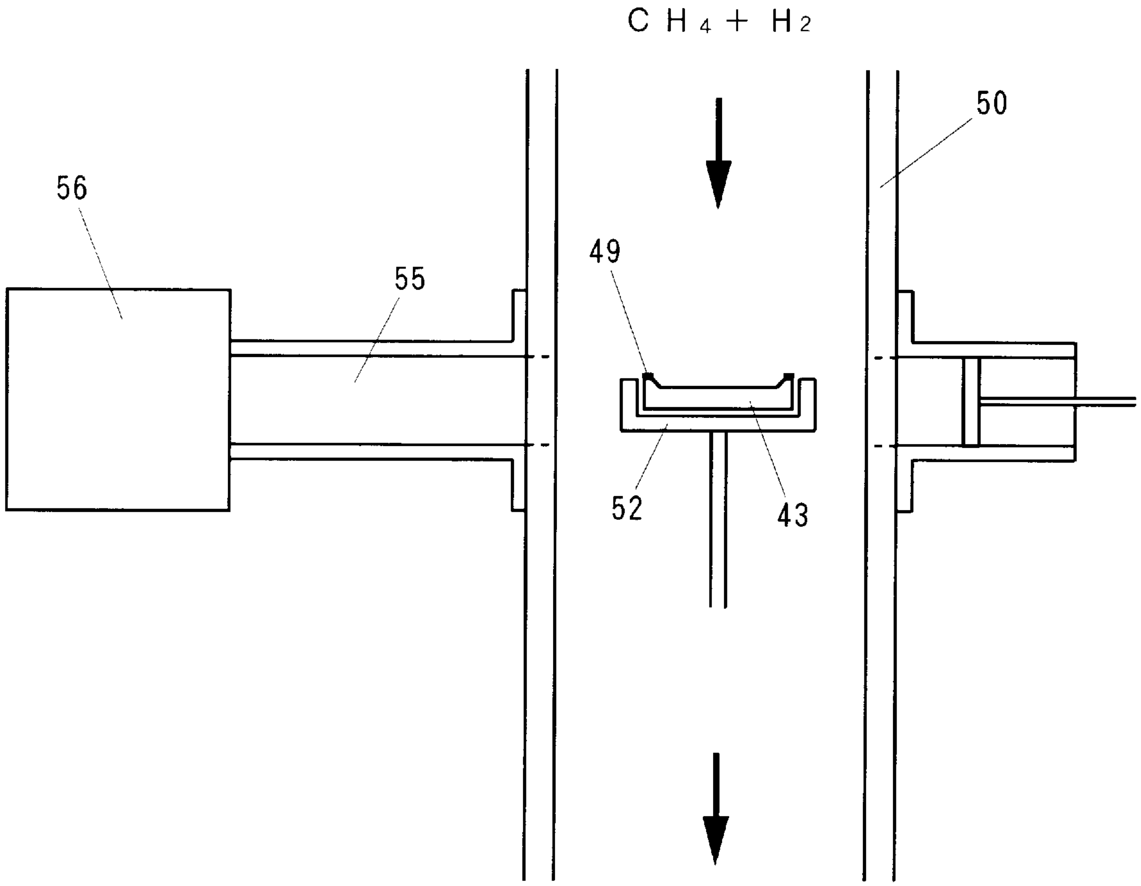
FIG. 26 is a schematic drawing illustrating the microwave plasma CVD method.

Referring to FIG. 26, substrate holder 52 is disposed within silica tube 50, which is disposed within a vacuum container (not shown in the drawings). As in the hot-filament CVD method described above, Si substrate 43 is mounted on the surface of substrate holder 52, and a gaseous mixture of $CH_4$ and $H_2$ is introduced to the surface of Si substrate 43.

Instead of using electric furnace 53 or hot filament 51, however, a 2.45 GHz microwave is sent from a microwave power supply 56 into silica tube 50 via a waveguide 55. An electrodeless plasma discharge is generated, and this plasma is used to break down and excite the methane and the hydrogen.

In the hot-filament CVD method, it is possible for a section of filament 51 to evaporate and penetrate into diamond particle 54, thus lowering the purity of the resulting diamond particle 54. This problem does not come up with the microwave plasma CVD method, however, since an electrodeless plasma discharge is used. With either of the methods described above, the shape of diamond particles 54 can be controlled by controlling the concentration of the introduced $CH_4$ gas.

For example, when the $CH_4$ concentration is set to 1 percent or less, the diamond crystals will grow into the angular shape that is natural to diamonds. If the $CH_4$ concentration is increased to about 2 percent, however, there will be less angularity, and the resulting crystals will be ball-shaped.

Thus, by adjusting the $CH_4$ concentration, the sharpness of end 15*a*' of the emitter cones can be changed.

Also, the shape and thickness (height) of diamond particles 54 can be controlled by adjusting the pressure inside the vacuum container within the range of several kPa and less than 100 kPa.

Furthermore, by adjusting the $CH_4$ gas or changing the overall synthesis time period, priority can be given to the <111>surface, which has especially strong negative electron affinity.

Besides using a gaseous mixture of $CH_4$ and $H_2$, it would also be possible to have the raw material for the diamond crystals be a gaseous mixture of CO and $H_2$, a gaseous mixture of $C_2H_2$ and $H_2$, or a mixture of $H_2$ and vaporized alcohol or acetone.

As described above, etching is performed on the surface of Si substrate 43 to form a cavity 42, and diamond particles 54 are grown on the bottom surface of cavity 42. These operations were performed for the reasons described below.

When the surface of Si substrate 43 is completely flat and smooth, the crystal nuclei will tend to not become fixed on the substrate surface when a gas containing the materials for diamond crystals is guided to the surface of Si substrate 43 using the hot-filament CVD method, the microwave plasma CVD method, or the like. This prevents the diamond crystals from growing with a uniform thickness.

However, when the surface is etched to form fine cavities and projections, it is easier for the diamond crystal nuclei to form at these cavities and projections, thus providing a roughly uniform thickness for the diamond crystals.

Also, by adjusting the thickness of cavity 42, it is possible to adjust the distance from second substrate member 12.

Instead of etching the surface of Si substrate 43, the formation of diamond crystal nuclei can also be facilitated by immersing Si substrate 43 in a solution of ethanol, isopropyl alcohol, or the like mixed with diamond or silica powder. Ultrasonic vibrations can then be applied to form fine scratches on the surface.

In the description above, an n-type semiconductor is used as the material for first substrate member 11 and second substrate member 12. However, the present invention is not restricted to this.

It would also be possible to have first substrate member 11 and second substrate member 12 formed from a p-type semiconductor comprising an impurity such as B (boron) mixed in Si.

Figure 27:
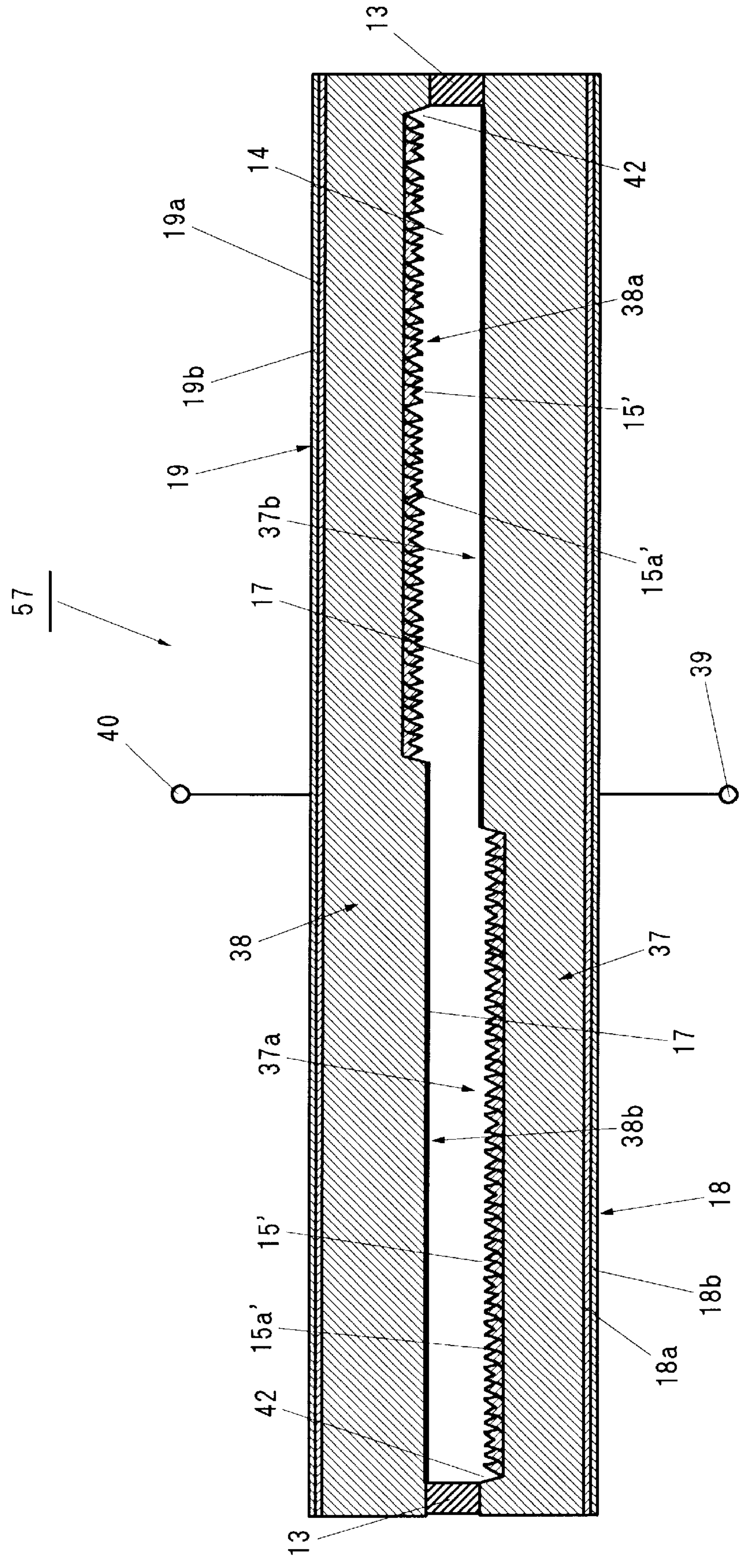
FIG. 27 is a cross-section drawing showing the fourth electric field electron discharge surge absorbing element according to the present invention.

Referring to FIG. 27, there is shown a fourth electric field electron discharge surge absorbing element 57.

Fourth electric field electron discharge surge absorbing element 57 is formed with a cavity 42 on a portion of the inner surface of third substrate member 37. Cavity 42 has a depth of several microns. A plurality of emitter cones 15' comprising fine diamond crystals are disposed on the bottom surface of cavity 42 to form first electron discharge portion 37*a*. The remaining flat portions form first flat portion 37*b*.

A portion of the inner surface of fourth substrate member 38 is also formed with a cavity 42 having a depth of several microns. A plurality of emitter cones 15' comprising fin diamond crystals are disposed on the bottom surface of cavity 42 to form second electron discharge portion 38*a*. The remaining flat portions form second flat portion 38*b*.

Referring to the drawings, first electron discharge portion 37*a* of the third substrate member is positioned to face second flat portion 38*b* of the fourth substrate member, and second electron discharge portion 38*a* of the fourth substrate member is positioned to face first flat portion 37*b* of the third substrate member.

Ends 15*a*' of the emitter cones are separated from first flat portion 37*b* and second flat portion 38*b* by a prescribed distance.

A protective film 17 made from the same material as described above covers the surfaces of first flat portion 37*b* and second flat portion 38*b*.

Other aspects of the structure are essentially identical to those of second electric field electron discharge surge absorbing element 36, so the overlapping descriptions will be omitted here.

In fourth electric field electron discharge surge absorbing element 57, the same procedures as those described above can be used to form cavities 42 on the inner surface of third substrate member 37 and fourth substrate member 38, as well as emitter cones 15' made from diamond crystals.

Figure 28:
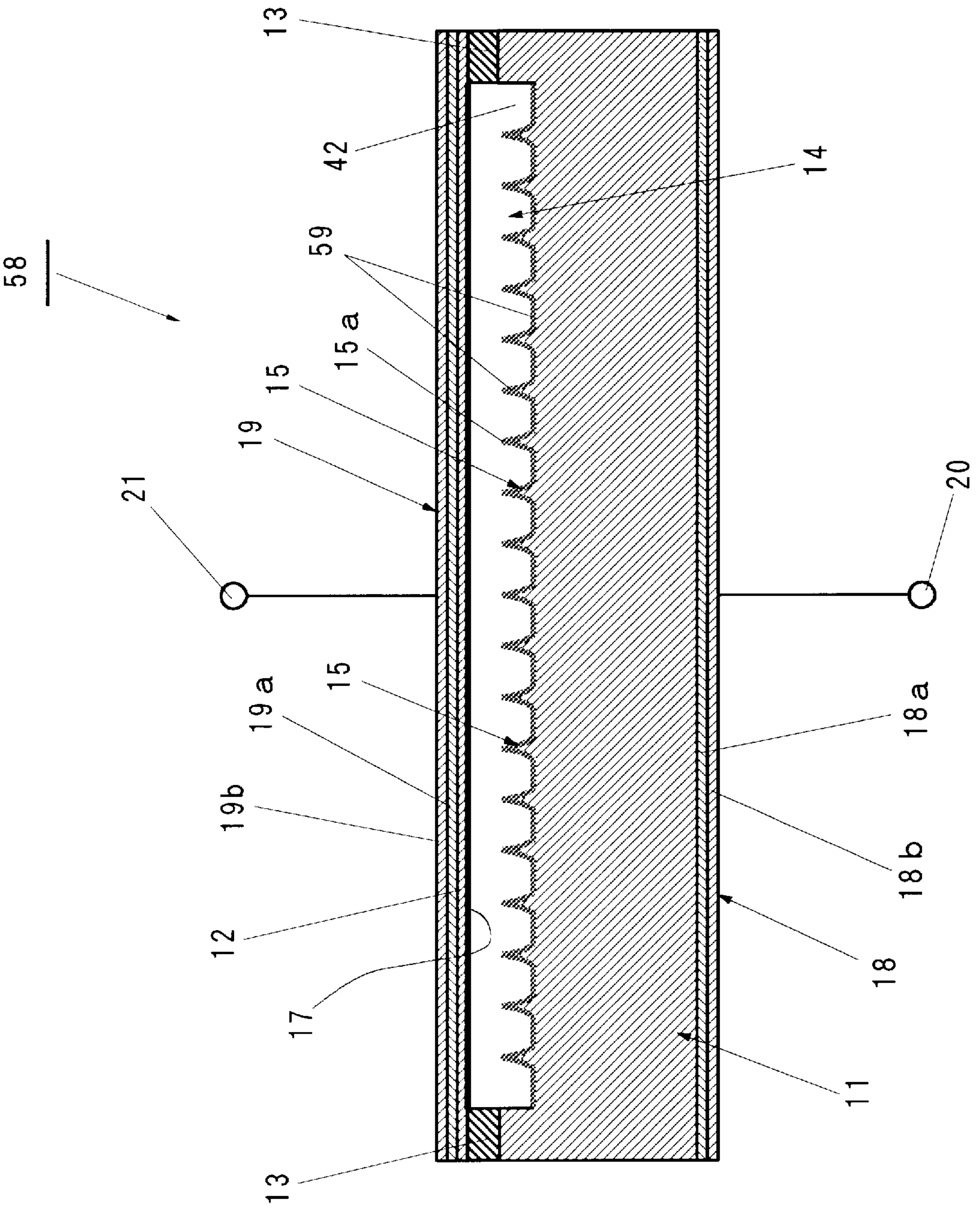
FIG. 28 is a cross-section drawing showing the fifth electric field electron discharge surge absorbing element according to the present invention.

Referring to FIG. 28, a fifth electric field electron discharge surge absorbing element 58 according to the present invention comprises a cavity 42 having a depth of several microns. Cavity 42 is formed on the inner surface of first substrate member 11, and a plurality of emitter cones 15 made from an n-type semiconductor is formed integrally on the bottom surface of cavity 42. Other aspects of the structure are essentially identical to those of first electric field electron discharge surge absorbing element 10.

The following is a description concentrating on the unique characteristics of fifth electric field electron discharge surge absorbing element 58, and overlapping descriptions will be omitted.

Figure 29:
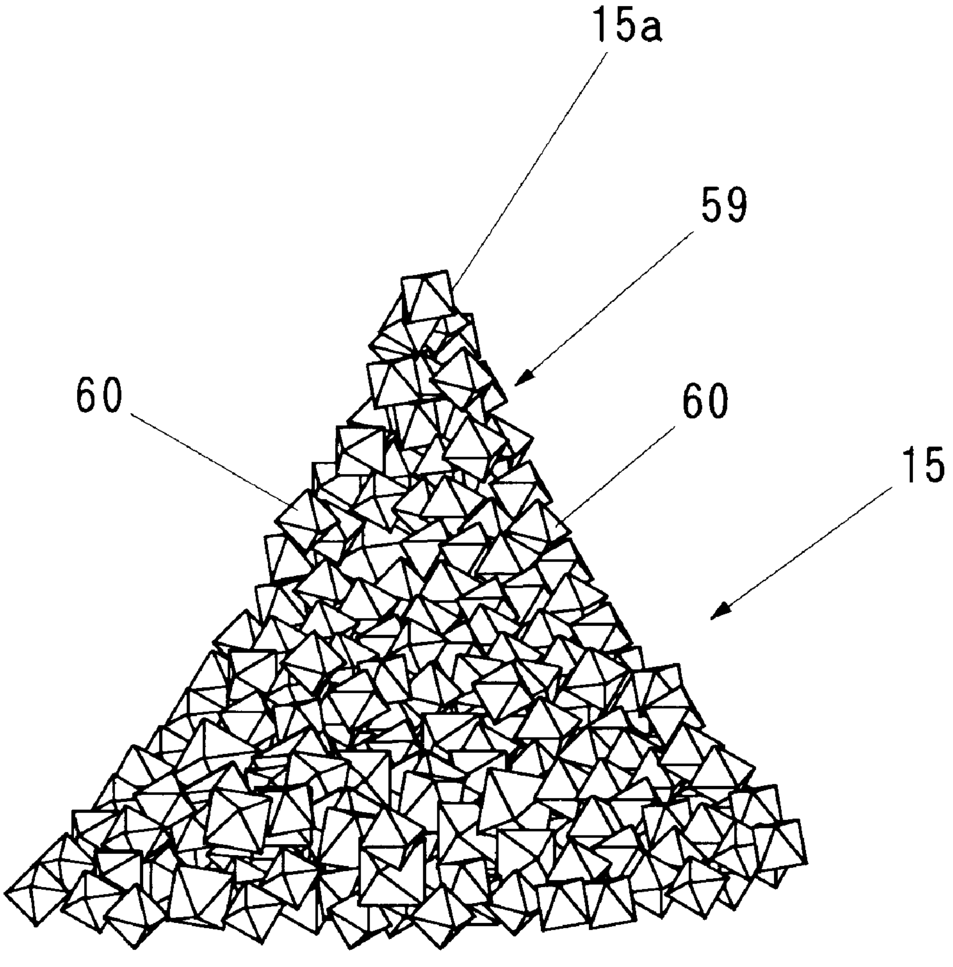
FIG. 29 is a drawing for the purpose of describing diamond thin-film formed on the emitter cone surface.

Referring to FIG. 29, a plurality of fine diamond crystals 60 are formed on the surface of emitter cones 15 in an overlapping manner.

Many of diamond crystals 60 comprise <111>surfaces, which have significant negative electron affinity and have good electron discharge properties. In third electric field electron discharge surge absorber 41 described above, emitter cones 15' themselves were made from diamond crystals, but in fifth electric field electron discharge surge absorbing element 58, a diamond film 59 is formed as a protective film on emitter cones 15, which are made from an n-type semiconductor.

Since emitter cones 15 are covered by diamond film 59, which have good electron discharge properties and are resistant to sputtering, fifth electric field electron discharge surge absorbing element 58 can be easily set to have a relatively low voltage at which to begin discharging and can also be made more durable.

The following is a description of how diamond film 59 is formed.

First, cavity 42 and emitter cone 15 are formed on the inner surface of first substrate member 11 using the same method as described above.

Figure 30:
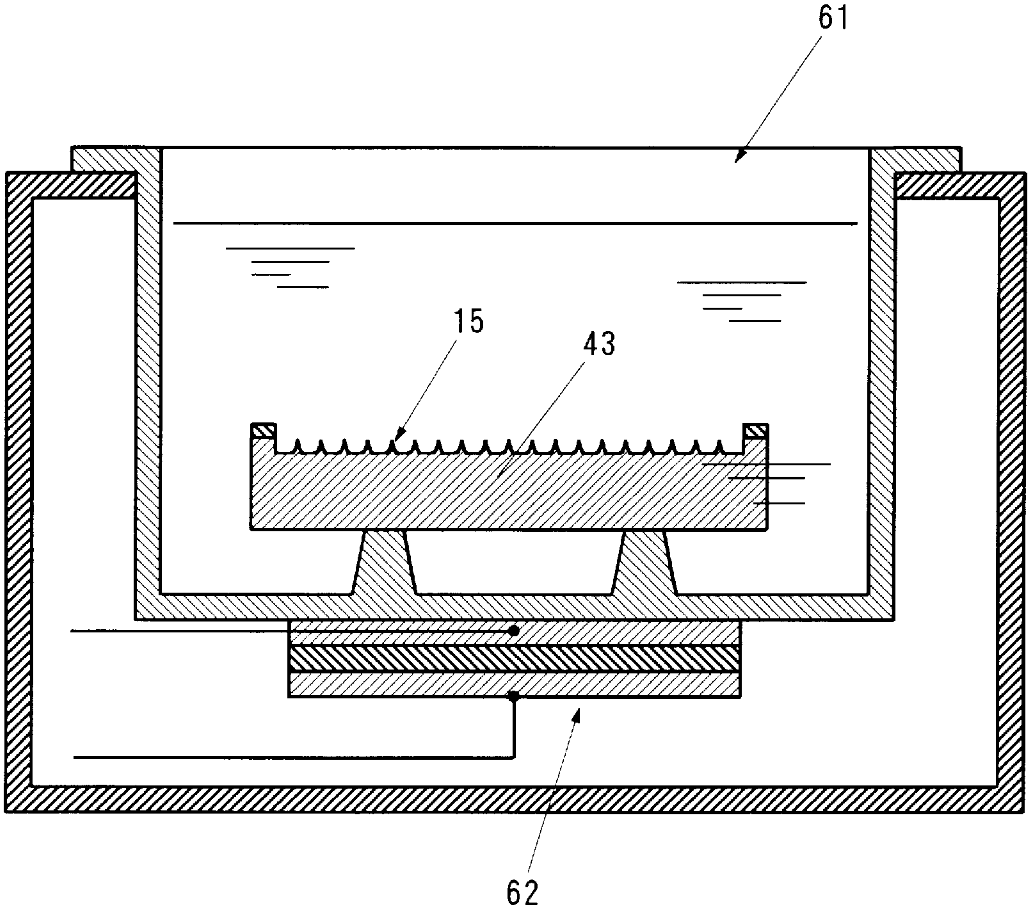
FIG. 30 is a cross-section drawing showing an Si substrate disposed within an ultrasonic tank.

Referring to FIG. 30, Si substrate 43, on which emitter cones 15 are formed, is disposed within an ultrasonic vibration tank 61.

Ultrasonic vibration tank 61 is filled with a solution such as ethanol or isopropyl alcohol containing a plurality of diamond particles having diameters on the order of 50 Angstroms.

An ultrasonic vibration member 62 comprising a piezoelectric element is connected to the back of the bottom surface of ultrasonic vibration tank 61.

When ultrasonic vibration member 62 is activated, the surface of Si substrate 43 is polished by the diamond particles, forming extremely fine scratches at high densities while a portion of the diamond particles adheses to the surface of Si substrate 43.

Then, the surface of Si substrate 43 is washed with ethanol or isopropyl alcohol, followed by a washing with pure water. Diamond film 59 is then formed on the surface of emitter cone 15.

The formation of diamond film 59 can be performed using the hot-filament CVD method or the microwave plasma CVD method described above.

By adjusting the overall synthesizing time and the $CH_4$ gas concentration, growth can be concentrated for the <111>surface, which has especially strong negative electron affinity.

The following is a description of the reasons behind forming a large number of fine scratches on the surface of Si substrate 43 before formation of the diamond film by immersing Si substrate 43 in a solution containing diamond particles and applying ultrasonic vibrations.

First, if the surface of Si substrate 43 is almost completely flat and smooth, crystal nuclei will tend not to accumulate on the substrate surface when a gas containing the diamond crystal material is introduced to the surface. This prevents the formation of a uniformly thick diamond film 59.

Also, if scratches formed on the surface of Si substrate 43 are relatively rough, the density at which diamond nuclei will be generated will be low, and fewer diamond crystals will be formed. This makes it difficult to provide an absolute amount of <111>surfaces, which contribute to the lowering of the voltage at which discharging starts.

However, if Si substrate 43 is immersed in a solution containing fine diamond particles on the order of 50 Angstroms and exposed to ultrasonic vibrations, a large numbers of very fine scratches will be formed on the surface of Si substrate 43, including emitter cones 15. This facilitates the adhesion of diamond particles that have small particle diameters.

Thus, when hot-filament CVD or microwave plasma CVD is used to guide a gas to form diamond crystals on the surface of cavity 42, there will be a higher density at which diamond nuclei are generated, and there will be a corresponding increase in the number of <111>surfaces, which have good electron discharge properties.

Figure 31:
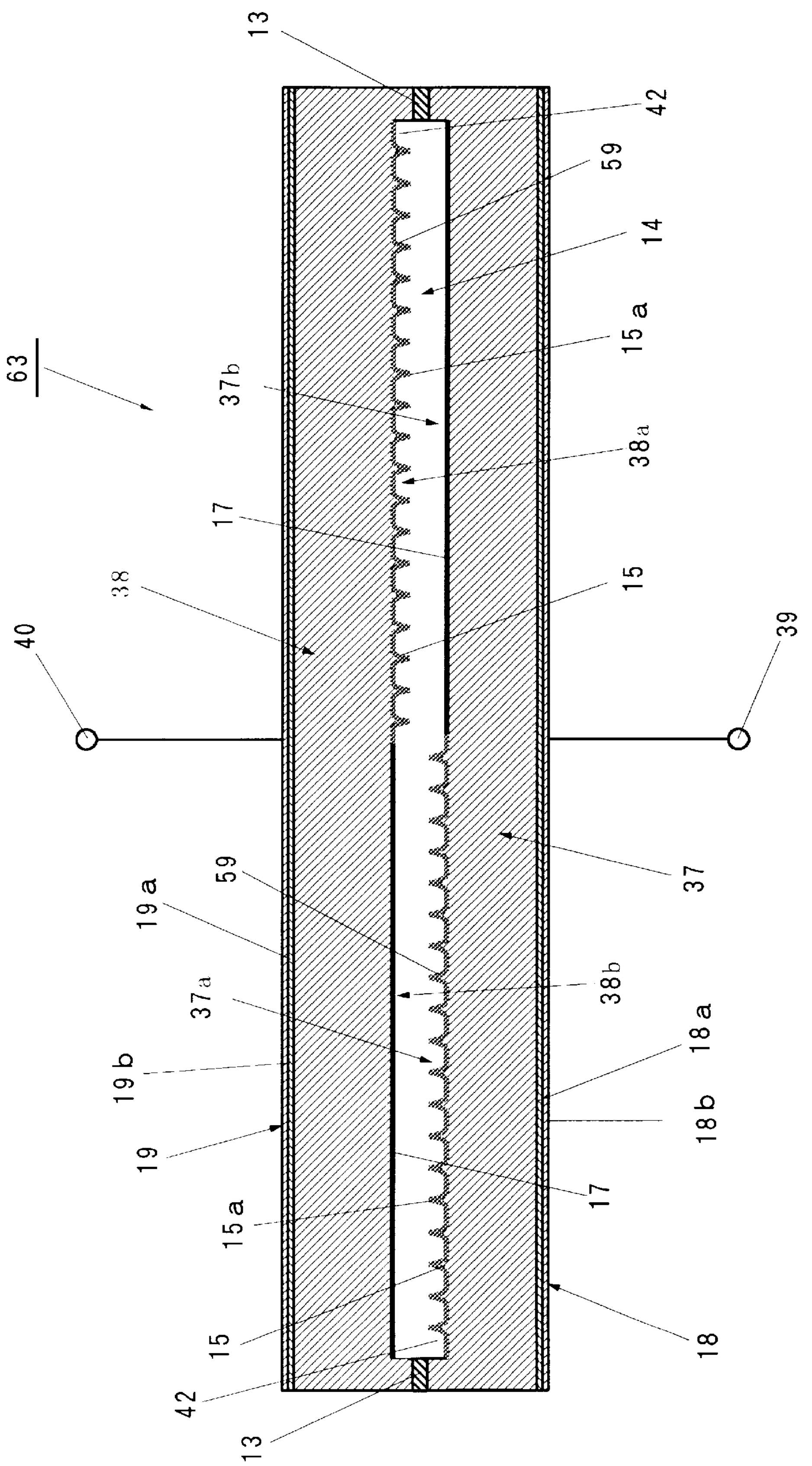
FIG. 31 is a cross-section drawing showing the fifth electric field electron discharge surge absorbing element according to the present invention.

Referring to FIG. 31, there is shown a sixth electric field electron discharge surge absorbing element 63.

In sixth electric field electron discharge surge absorbing element 63, a cavity 42 having a depth of several microns is formed in a portion of the inner surface of third substrate member 37. A plurality of emitter cones 15, comprising an n-type semiconductor, is formed integrally on the bottom surface of cavity 42 to serve as first electron discharge portion 37*a*. The remaining flat portions serve as first flat portion 37*b*.

A cavity 42 having a depth of several microns is also formed on a portion of the inner surface of fourth substrate member 38. A plurality of emitter cones 15, comprising an n-type semiconductor, is formed integrally on the bottom surface of cavity 42 to serve as second electron discharge portion 38*a*. The remaining flat portions serve as second flat portion 38*b*.

Diamond film 59 is formed as a protective film on the surface of emitter cones 15.

Referring to FIG. 31, first electron discharge portion 37*a* of third substrate member 37 is positioned to face second flat portion 38*b* of fourth substrate member 38, and second electron discharge portion 38*a* of fourth substrate member 38 is positioned to face first flat portion 37*b* of third substrate member 37.

A prescribed distance separates ends 15*a* of the emitter cones from flat portions 37*b*, 38*b*.

A protective film 17 covers the surface of flat portions 37*b*, 38*b*.

Other aspects of the structure are essentially identical to those of second electric field electron discharge surge absorbing element 36, so the overlapping descriptions will be omitted here.

In sixth electric field electron discharge surge absorbing element 63, it is also possible to form diamond film 59 on the surface of emitter cones 15 using the same methods as described above.

Figure 32:
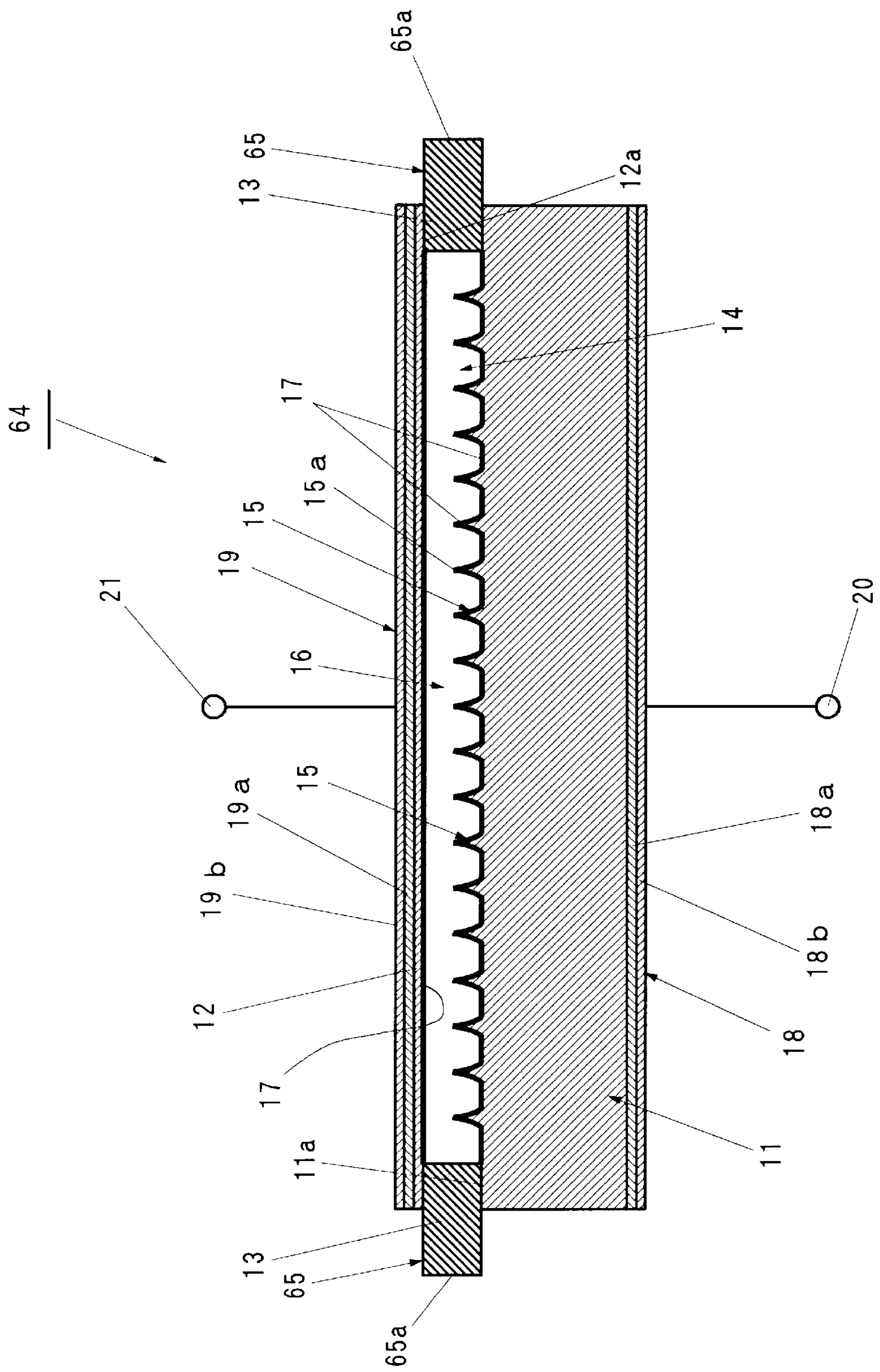
FIG. 32 is a cross-section drawing showing the sixth electric field electron discharge surge absorbing element according to the present invention.
Figure 33:
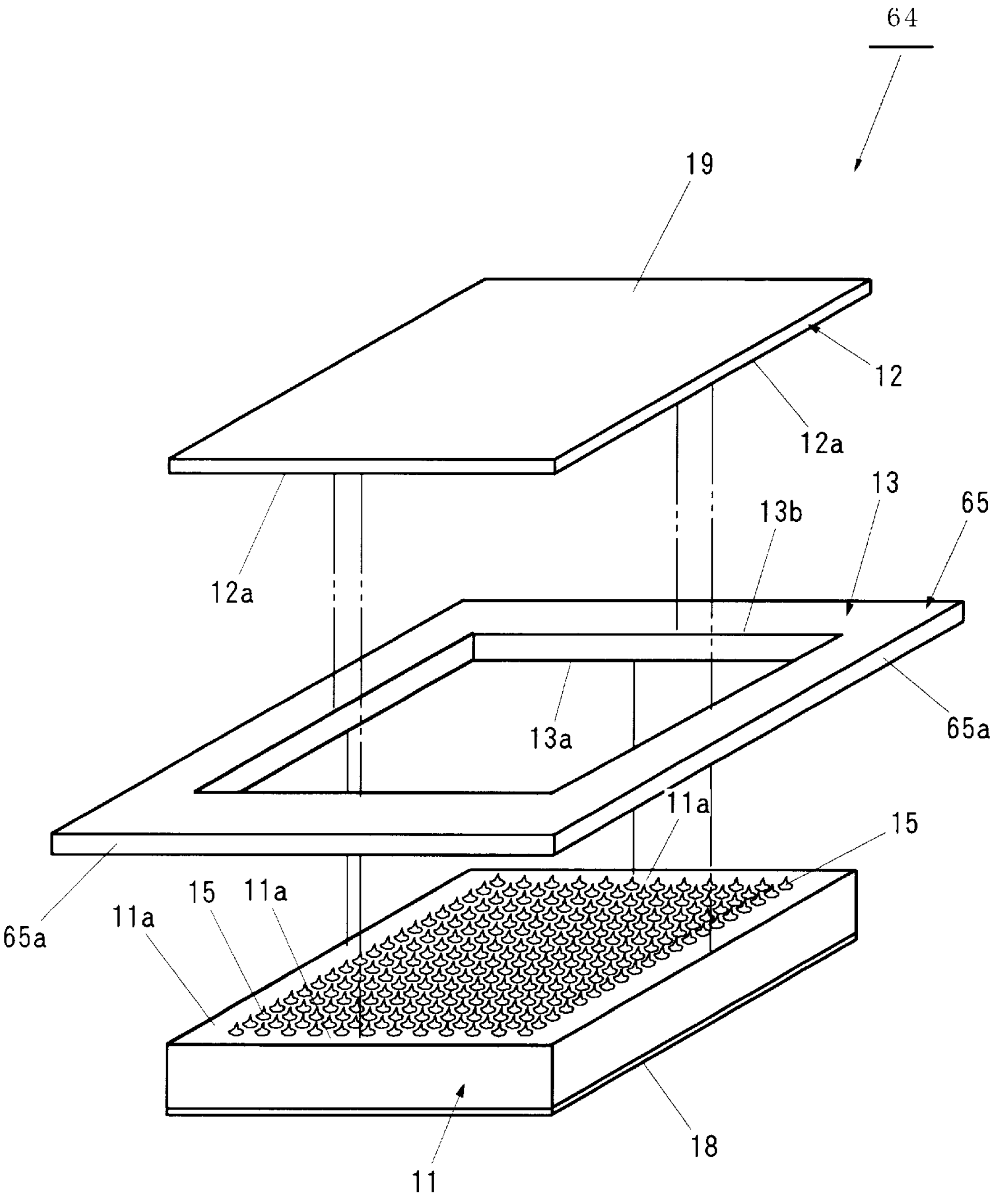
FIG. 33 is an exploded perspective drawing showing the seventh electric field electron discharge surge absorbing element according to the present invention.

Referring to FIG. 32 and FIG. 33, the following is a description of seventh electric field electron discharge surge absorbing element 64.

In seventh electric field electron discharge surge absorbing element 64, the shape and dimensions of frame member 13 are unique. Other aspects of the structure are essentially identical to that of first electric field electron discharge surge absorbing element 10.

The following description will focus on the unique aspects of seventh electric field electron discharge surge absorbing element 64, and portions that are identical to first electric field electron discharge surge absorbing element 10 will be omitted from the description.

Referring to FIG. 33, frame member 13 comprises a rectangular glass plate having a large rectangular section cut out from the center.

The vertical and horizontal dimensions of frame member 13 are larger than the vertical and horizontal dimensions of first substrate member 11 and second substrate member 12. Thus, when inner surface perimeter portion 11 a of first substrate member 11 and inner surface perimeter portion 12*a* of second substrate member 12 are bonded to frame member 13, an outer perimeter edge portion 65 of frame member 13 projects out from the outer side surface of first substrate member 11 and second substrate member 12 (FIG. 32).

The material used in frame member 13 is a borosilicate glass (trade name: Pyrex glass) having a thermal expansion coefficient close to that of n-type semiconductors, and containing $Na^+$ as a mobile ion.

In seventh electric field electron discharge surge absorbing element 64, the projection of outer perimeter edge portion 65 provides improved bonding when first substrate member 11 and second substrate member 12 are bonded using the positive-pole bonding method.

Figure 34:
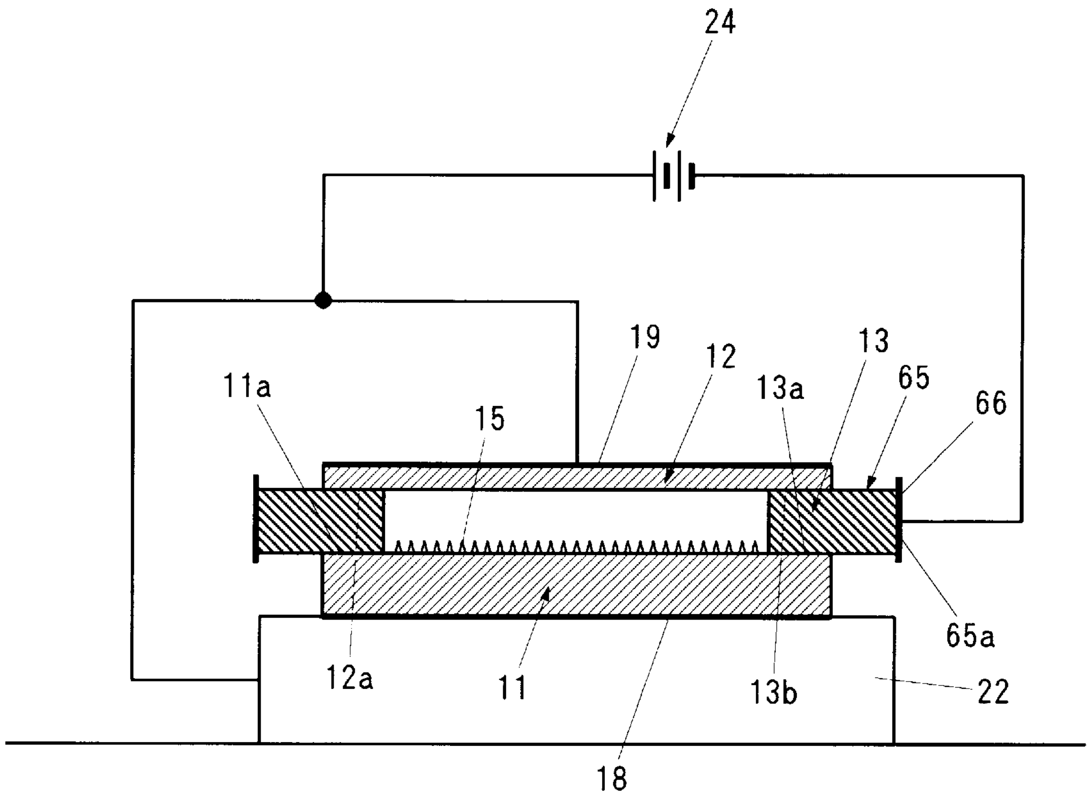
FIG. 34 is a schematic cross-section drawing showing the process for bonding the first substrate member and the second substrate member in the seventh electric field electron discharge surge absorbing element.

Referring to FIG. 34, hot plate 22 is disposed in a vacuum atmosphere. On the upper surface of hot plate 22 are stacked first substrate member 11, on which emitter cones 15 and first external electrode layer 18 have already been formed, frame member 13, and second substrate member 12, on which second external electrode layer 19 has already been formed.

An electrode frame 66 is fixed to outer perimeter end surface 65*a* of frame member 13.

Figure 35:
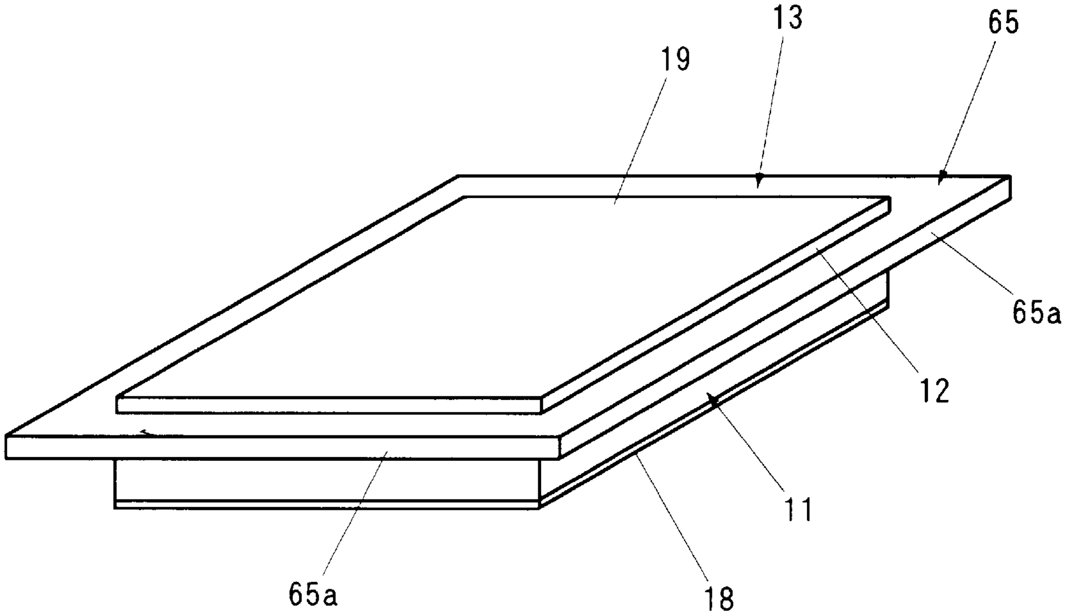
FIG. 35 is a perspective drawing showing the electrode frame.
Figure 35:
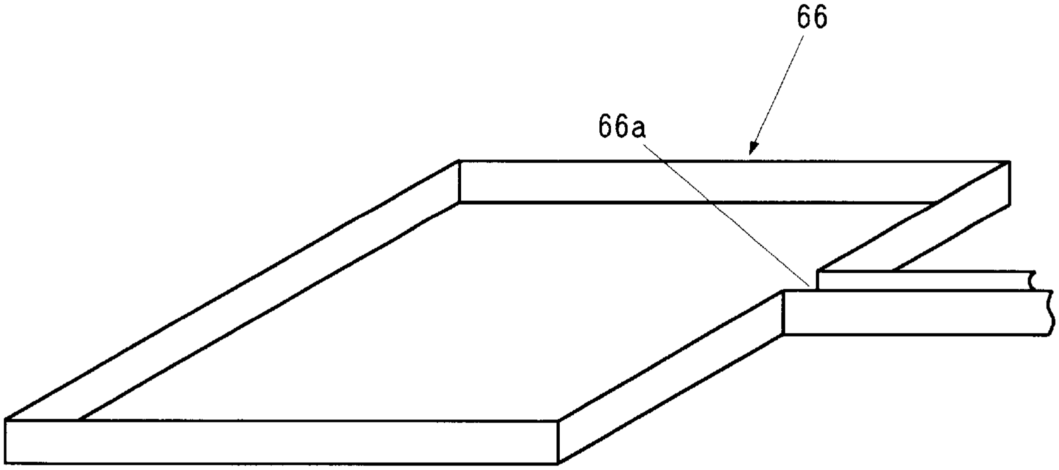

Referring to FIG. 35, electrode frame 66 is formed by taking a flexible metal band having good conductive properties and bending it into a rectangular so that it corresponds to outer perimeter edge portion 65 of frame member 13.

An opening/closing end 66*a* is spread apart laterally and outer perimeter edge portion 65 is guided into electrode frame 66. Opening/closing end 66*a* is then closed, and the restoring force of electrode frame 66 itself results in outer perimeter end surface 65*a* of frame member 13 and the inner surface of electrode frame 66 being fixed together.

The positive side of direct current power supply 24 is connected to second external electrode layer 19 of second substrate member 12. The positive side of direct current power supply 24 is also connected to first external electrode layer 18 of first substrate member 11 via hot plate 22.

Figure 36:
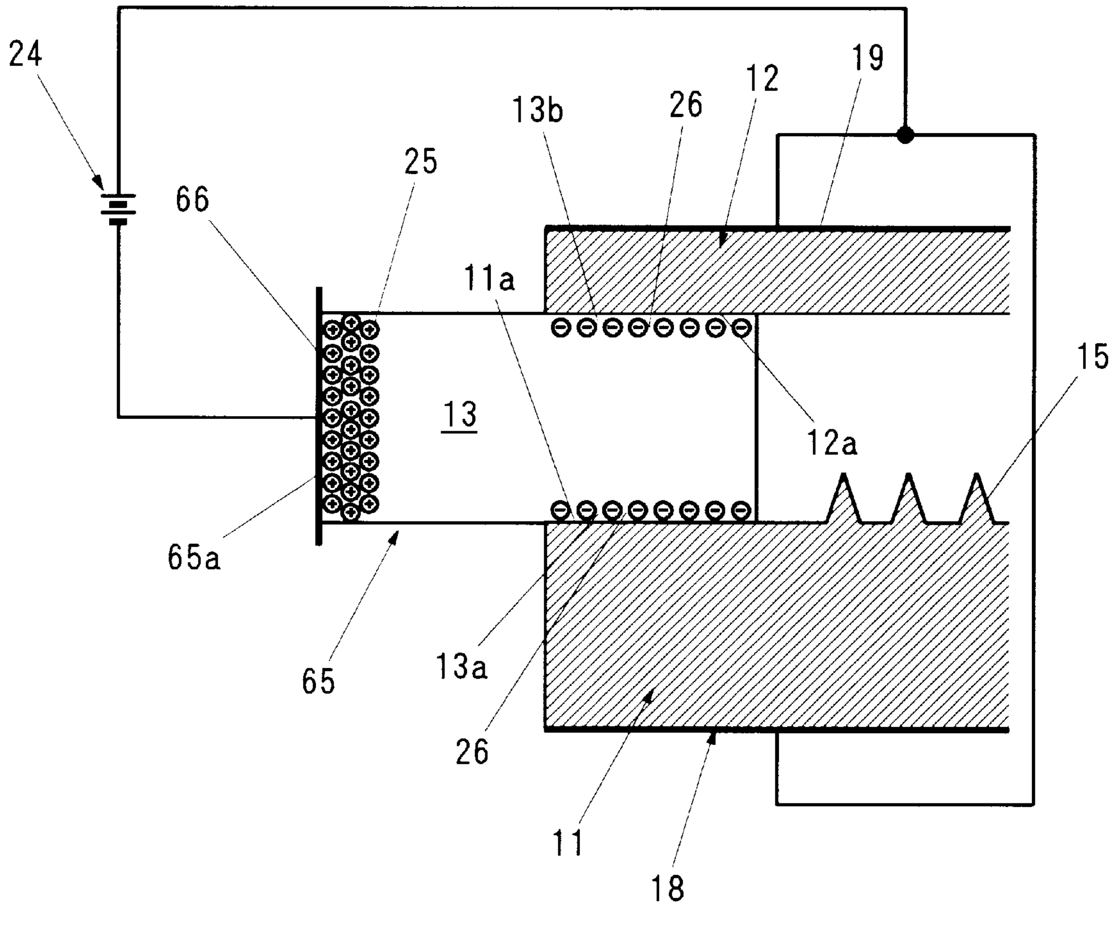
FIG. 36 is a schematic drawing showing the principles involved in the bonding of the first substrate member, the frame member, and the second substrate member.

The negative side of direct current power supply 24 is connected to electrode frame 66 covering outer perimeter end surface 65*a* of frame member 13. A voltage of 50–1000 V is applied from direct current power supply 24. Referring to FIG. 36, positive ions ($Na^+$) 25 in the glass that makes up frame member 13 moves toward electrode frame 66. Simultaneously, a negative load is concentrated around the boundary surface between first substrate member 11 and second substrate member 12, and a space-charge layer 26 is formed. A large attractive force is generated, and first substrate member 11 and second substrate member 12 are chemically bonded to frame member 13.

Thus, the positive-pole bonding between inner surface perimeter portion 11*a* of the first substrate member and first contact surface 13*a* of frame member 13 takes place simultaneously as the positive-pole bonding between inner surface perimeter portion 12*a* of the second substrate member and second contact surface 13*b* of frame member 13, providing an efficient bonding operation.

Outer perimeter edge portion 65 of frame member 13 is projected from the outer side surfaces of first substrate member 11 and second substrate member 12 in order to provide space on which positive ions 25 can accumulate.

Also, the creepage distance between first external electrode layer 18 of first substrate member 11 and second external electrode layer 19 of second substrate member 12 is made longer by the amount that outer perimeter edge portion 65, which is made from an insulative material, is projected. Thus, in the event of a surge, the possibility of continuity developing inadvertently between first external electrode layer 18 and second external electrode layer 19 via the outer side surface of envelope 14 (instead of an electric field electron discharge being generated properly inside envelope 14) is effectively prevented.

Electrode frame 66 surrounds and is fixed to outer perimeter edge portion 65 of frame member 13 as described above so that an electric field can be applied uniformly over the entirety of outer perimeter end surface 65*a*.

In order to provide a stronger positive-pole bond than the one described above, it is necessary to make inner surface perimeter portion 12*a* of second substrate member 12 and contact surfaces 13*a*, 13*b* of frame member 13 as flat and smooth as possible. For example, it would be desirable to limit surface inconsistencies to 1 micron or less.

Figure 37:
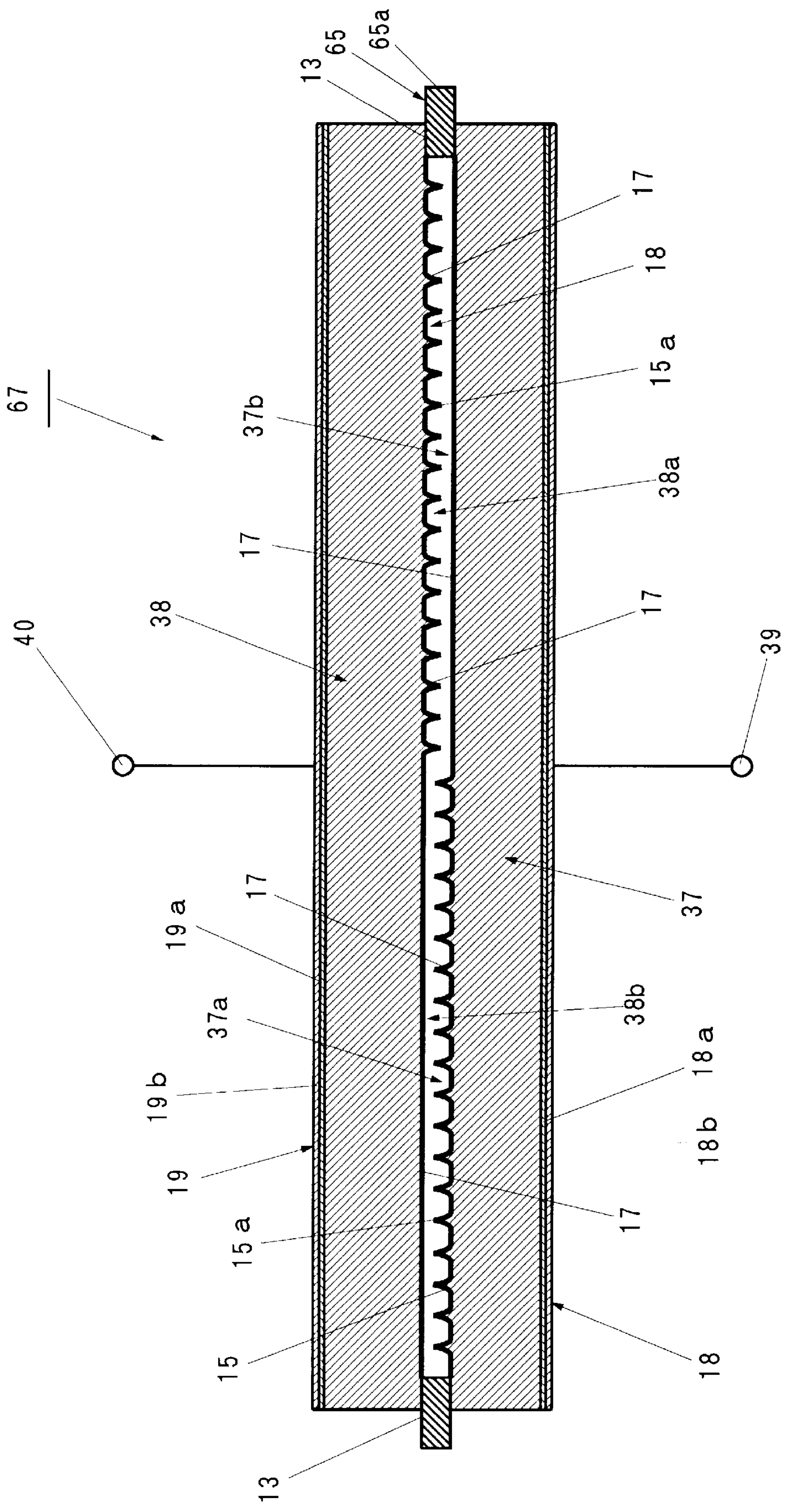
FIG. 37 is a cross-section drawing showing the eighth electric field electron discharge surge absorbing element according to the present invention.

Referring to FIG. 37, there is shown an eighth electric field electron discharge surge absorber 67.

The basic structure of eighth electric field electron discharge surge absorber 67 is based on second electric field electron discharge surge absorbing element 36, while frame member 13 is unique.

As in seventh electric field electron discharge surge absorbing element 64, the vertical dimension and horizontal dimension of frame member 13 are larger than the vertical dimension and the horizontal dimension of third substrate member 37 and fourth substrate member 38. When inner surface perimeter portion 37*a* of the third substrate member and inner surface perimeter portion 38*a* of the fourth substrate member are bonded, outer perimeter edge portion 65 of frame member 13 projects out from the outer side surface os third substrate member 37 and fourth substrate member 38.

Other aspects of the structure are essentially identical to those of second electric field electron discharge surge absorbing element 36.

In eighth electric field electron discharge surge absorber 67, the positive-pole bonding of third substrate member 37 and fourth substrate member 38 to frame member 13 is performed in the same manner as described above.

Figure 38:
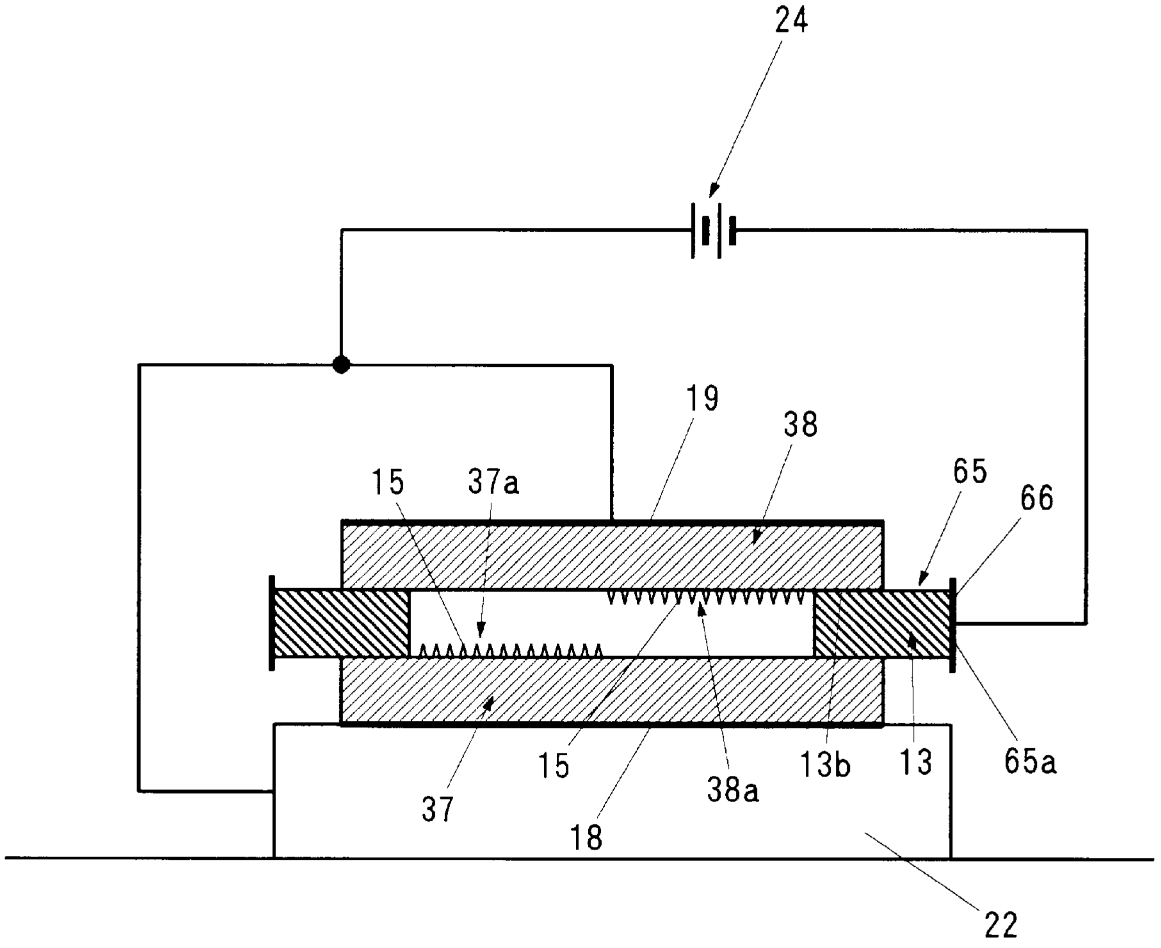
FIG. 38 is a schematic cross-section drawing showing the bonding process for the first substrate member, the frame member, and the second substrate member in the eighth electric field electron discharge surge absorbing element.

Referring to FIG. 38, hot plate 22 is disposed within a vacuum atmosphere. On the upper surface of hot plate 22 are stacked third substrate member 37, on which emitter cones 15 and first external electrode layer 18 have already been formed, and fourth substrate member 38, on which emitter cones 15 and second external electrode layer 19 have been formed, with frame member 13 interposed between the two. The positive side of direct current power supply 24 is connected to first external electrode layer 18 and second external electrode layer 19. The negative side of direct current power supply 24 is connected to electrode frame 66, which is fixed to outer perimeter end surface 65*a* of frame member 13.

A prescribed DC voltage is applied while hot plate 22 is heated to 200–600° C. The positive ions ($Na^+$), which are not shown, inside frame member 13 move toward the contact surface with electrode frame 66. A space-charge layer (not shown) is formed around the contact surface between third substrate member 37 and fourth substrate member 38. Positive-pole bonding between the inner surface perimeter portion of the third substrate member and the contact surface of frame member 13 takes place simultaneously as the inner surface perimeter portion of the fourth substrate member and the contact surface of frame member 13.

Figure 39:
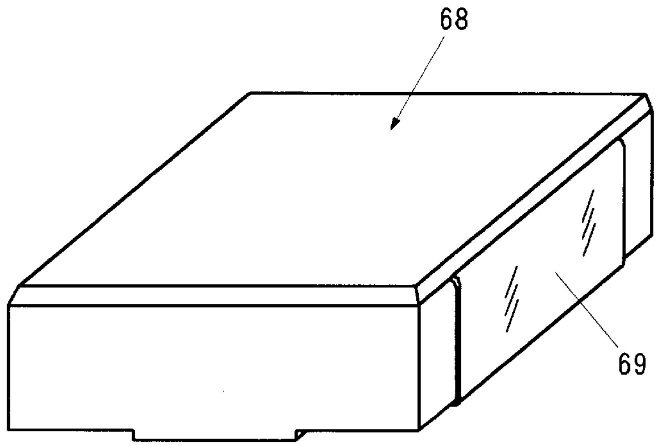
FIG. 39 is a perspective drawing showing the insulative outer cover mounted on the eighth electric field electron discharge surge absorbing element.
Figure 40:
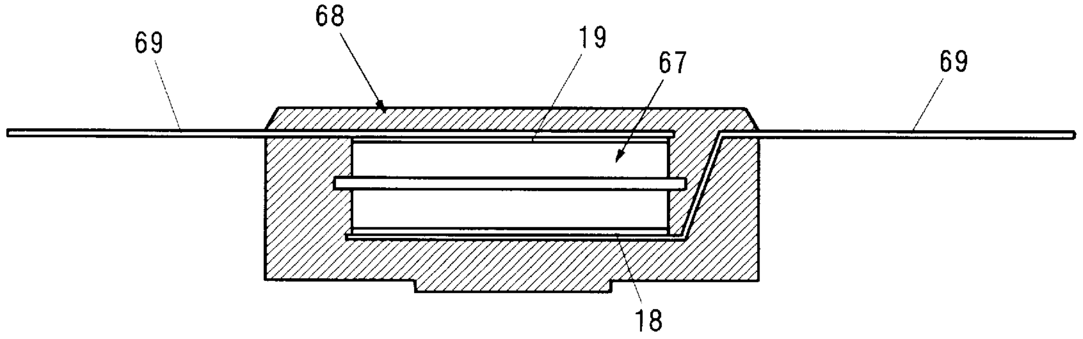
FIG. 40 is a partial cross-section drawing showing the internal structure of the insulative outer cover having extending lead terminal plates.
Figure 41:
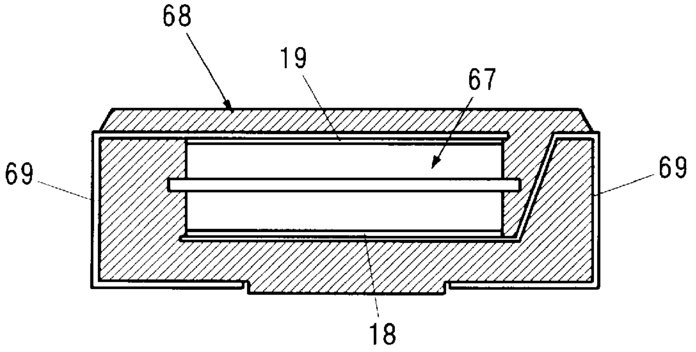
FIG. 41 is a partial cross-section drawing showing the internal structure of the insulative outer cover having bent lead terminal plates.

Referring to FIG. 39–FIG. 41, there is shown an example wherein an insulative outer cover 68 made from an epoxy resin is applied to eighth electric field electron discharge surge absorber 67.

Referring to FIG. 40, inside insulative outer cover 68, lead terminal plates 69 are soldered or welded to first external electrode layer 18 and second external electrode layer 19 of eighth electric field electron discharge surge absorber 67.

Lead terminal plate 69 is made from an alloy having Cu as its main element and mixed with 3–3.5 percent by weight of Ni, 0.6–0.8 percent by weight of Si, and 0.2–0.4 percent by weight of Zn.

The end of lead terminal plate 69 connected to second external electrode layer 19 passes through insulative outer cover 68 and extends to the outside.

Lead terminal plate 69 connected to first external electrode layer 18 is bent. Its end also passes through insulative outer cover 68 and extends to the outside at roughly the same height as the lead terminal plate described above.

Solder plating is performed on the surfaces of the outward-extended lead terminal plates 69. Referring to FIG. 41, the leads are then bend twice along the side surface and bottom surface of insulative outer cover 68.

Insulative outer cover 68 can of course also be used for any of first electric field electron discharge surge absorbing element 10 through seventh electric field electron discharge surge absorbing element 64.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electric field electron discharge surge absorbing element, comprising:

a first substrate member made from a semiconductor material having on a surface an electron discharge portion, on which a plurality of emitters are formed;

a second substrate member having a surface;

said electron discharge portion and said surface being positioned to face each other;

a frame member, effective to separate said electron discharge portion and said surface by a prescribed distance, said distance between said electron discharge portion and said surface being substantially equal throughout;

an air-tight seal between inner surface perimeter portions of said first and second substrate members and said frame member; and outer electrode layers formed on outer surfaces of said first substrate member and second substrate member.

2. An electric field electron discharge surge absorbing element according to claim 1, wherein said emitters are cone-shaped and are formed integrally with said first substrate member.

3. An electric field electron discharge surge absorbing element according to claim 1, further comprising a protective diamond film formed on said emitters.

4. An electric field electron discharge surge absorbing element according to claim 3, wherein said protective diamond film contains impurities.

5. An electric field electron discharge surge absorbing element as according to claim 1, wherein said emitters are formed from diamond crystals.

6. An electric field electron discharge surge absorbing element according to claim 5, wherein said emitters are formed from diamond crystals having impurities.

7. An electric field electron discharge surge absorbing element according to claim 1, wherein:

said frame member includes an insulative material; and said frame member includes a first contact surface in contact with said inner surface perimeter portion of said first substrate member, a second contact surface in contact with said inner surface perimeter portion of said second substrate member, and an outer perimeter portion.

8. An electric field electron discharge surge absorbing element, comprising:

a first substrate member, said first substrate member being made from a semiconductor material and having first and second surface portions, having on said first surface portion an electron discharge portion, on which a plurality of emitters are formed, and a portion on said second surface portion not occupied by emitters;

a second substrate member, said second substrate member being made from a semiconductor material and having first and second surface portions, having on said first surface portion an electron discharge portion, on which a plurality of emitters are formed, and a portion on said second surface portion not occupied by emitters;

said first and second substrate members being positioned to face each other such that ends of said emitters on each of said substrate members face said second surface portion of another of said substrate members;

a frame member, effective to separate said first and second substrate members by a prescribed distance, said distance between said electron discharge portion and said second surface portion being substantially equal throughout;

an air-tight seal between inner surface perimeter portions of said first and second substrate members and said frame member; and external electrode layers formed on outer surfaces of said first substrate member and said second substrate member.

9. An electric field electron discharge surge absorbing element according to claim 8, wherein said emitters are cone-shaped and are formed integrally with each of said first and second substrate members.

10. A method for making an electric field electron discharge surge absorbing element, comprising the steps of:

forming a plurality of oxidized-film masks on a surface of a first substrate member;

performing reactive ion etching on said surface of said first substrate member to form pillar-shaped projections under said oxidized-film masks;

performing anisotropic wet etching on said projections to etch said surface and form emitters;

positioning said first substrate member having said emitters to face a second substrate member, said second substrate member having a surface;

separating said first and second substrate members at a prescribed distance by a frame member, said distance between said emitters and said surface being substantially equal throughout;

sealing inner surface perimeter portions of said first and second substrate members and said frame member to form an envelope; and drawing a vacuum within said envelope.

11. A method for making an electric field electron discharge surge absorbing element according to claim IO, wherein said frame member is made from an insulative material containing mobile ions.

12. A method for making an electric field electron discharge surge absorbing element according to claim 11, further comprising the steps of:

connecting a positive side of a direct current power supply to external electrode layers of said substrate members;

connecting a negative side of said direct current power supply to an end surface of an outer perimeter portion of said frame member;

applying a voltage from said direct current power supply in a vacuum atmosphere heated to a prescribed temperature, such that said inner surface perimeter portion of said first substrate member and a first contact surface of said frame member are positive-pole bonded while simultaneously said inner surface perimeter portion of said second substrate member and a second contact surface of said frame member are positive-pole bonded.

13. A method for making an electric field electron discharge surge absorbing element according to claim 11, wherein said frame member includes a borosilicate glass containing $Na^+$.

14. A method for making an electric field electron discharge surge absorbing element according to claim 12, further comprising:

fitting an electrode frame comprising a metal band bent in a shape corresponding to said outer perimeter portion of said frame member to said frame member; and connecting a negative side of said direct current power supply to said electrode frame, whereby a uniform voltage is applied to an entire end surface of said outside perimeter portion.

15. A method for making an electric field electron discharge surge absorbing element according to claim 10, wherein said reactive ion etching is performed using a gas mixture of $SF_6$ and $O_2$.

16. A method for making an electric field electron discharge surge absorbing element according to claim 10, wherein said anisotropic wet etching is performed using an aqueous solution of KOH.

17. A method for making the electric field electron discharge surge absorbing element according to claim 10, further comprising the steps of:

forming a plurality of fine scratches on said surface of said first substrate member;

placing said first substrate member in a vacuum system previously heated to a prescribed temperature;

introducing a gas to the surface of said first substrate member; and activating said gas, whereby a diamond film is grown on said surface of said emitters.

18. A method for making an electric field electron discharge surge absorbing element according to claim 17, wherein said plurality of fine scratches are formed by immersing said first substrate member in a solution containing fine diamond particles, and applying ultrasonic vibrations to said first substrate member.

19. A method for making an electric field electron discharge surge absorbing element according to claim 17, wherein said gas is mixed with an impurity gas.

20. A method for making an electric field electron discharge surge absorbing element, comprising the steps of:

placing a first substrate member, said first substrate member being a semiconductor, in a vacuum system previously heated to a prescribed temperature;

introducing a gas to a surface of said first substrate member;

activating said gas to grow diamond crystals on said surface of said first substrate member, whereby a plurality of emitters comprising diamond crystals are formed on said surface;

positioning said first substrate member with emitters to face a second substrate member having a surface;

separating said first and second substrate members at a prescribed distance by a frame member, said distance between said emitters and said surface being substantially equal throughout;

sealing inner surface perimeter portions of said first and second substrate members and said frame member to form an envelope; and drawing a vacuum within said envelope.

21. A method for making an electric field electron discharge surge absorbing element according to claim 20, further comprising mixing an impurity gas with said gas.

* * * * *